United States Patent
Moon et al.

(10) Patent No.: US 8,810,490 B2
(45) Date of Patent: Aug. 19, 2014

(54) DISPLAY APPARATUS

(75) Inventors: Sungjae Moon, Seoul (KR); Donggyu Kim, Yongin-si (KR); Seongyoung Lee, Anyang-si (KR); Ji-Sun Kim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 662 days.

(21) Appl. No.: 12/842,199

(22) Filed: Jul. 23, 2010

(65) Prior Publication Data

US 2011/0156992 A1    Jun. 30, 2011

(30) Foreign Application Priority Data

Dec. 30, 2009   (KR) ................ 10-2009-0134578

(51) Int. Cl.
  *G09G 3/34*    (2006.01)
  *G09G 3/20*    (2006.01)

(52) U.S. Cl.
  USPC ............................................. 345/84; 345/58

(58) Field of Classification Search
  USPC ......................................................... 345/84
  See application file for complete search history.

(56) References Cited

U.S. PATENT DOCUMENTS

| | | | | |
|---|---|---|---|---|
| 4,800,375 | A * | 1/1989 | Silverstein et al. | 345/694 |
| 6,903,754 | B2 * | 6/2005 | Brown Elliott | 345/694 |
| 6,954,191 | B1 * | 10/2005 | Hirano et al. | 345/77 |
| 7,492,343 | B2 * | 2/2009 | Kang et al. | 345/100 |
| 8,299,992 | B2 * | 10/2012 | Chen et al. | 345/87 |
| 2002/0080313 | A1 * | 6/2002 | Lim | 349/143 |
| 2002/0109652 | A1 * | 8/2002 | Lim et al. | 345/87 |
| 2003/0164498 | A1 * | 9/2003 | Sung et al. | 257/43 |
| 2005/0134544 | A1 * | 6/2005 | Igarashi et al. | 345/98 |
| 2006/0202927 | A1 | 9/2006 | Lee | |
| 2007/0064190 | A1 * | 3/2007 | Kim | 349/142 |
| 2007/0182692 | A1 * | 8/2007 | Kwon et al. | 345/100 |
| 2008/0068524 | A1 * | 3/2008 | Kim | 349/38 |
| 2008/0117231 | A1 * | 5/2008 | Kimpe | 345/629 |
| 2008/0231577 | A1 | 9/2008 | Lin et al. | |
| 2009/0040243 | A1 | 2/2009 | Hisada et al. | |
| 2009/0122248 | A1 * | 5/2009 | Kim et al. | 349/139 |

FOREIGN PATENT DOCUMENTS

| | | |
|---|---|---|
| CN | 101387778 | 3/2009 |
| JP | 09318954 | 12/1997 |
| JP | 11-102174 | 4/1999 |
| JP | 2007156414 | 6/2007 |
| KR | 100472356 B1 | 2/2005 |
| KR | 1020070035296 A | 3/2007 |
| KR | 20080089747 | 10/2008 |

* cited by examiner

*Primary Examiner* — Alexander S Beck
*Assistant Examiner* — Mihir Rayan
(74) *Attorney, Agent, or Firm* — F. Chau & Associates, LLC

(57) ABSTRACT

In a display apparatus, a plurality of pixels are arranged in first and second directions, and each pixel includes at least one dot. A plurality of data lines are provided between two adjacent dots while extending in the first direction. A plurality of gate lines are provided between two adjacent dots while extending in the second direction. Among dots arranged in the first direction between an $m^{th}$ data line and an $(m+1)^{th}$ data line, at least one first dot is connected to one of the $m^{th}$ data line and the $(m+1)^{th}$ data line, and at least one second dot is connected to one of an $(m-1)^{th}$ data line and an $(m+2)^{th}$ data line. Accordingly, the display quality of the display apparatus including four dots or an even number of dots is improved.

12 Claims, 24 Drawing Sheets

DISPLAY APPARATUS

CROSS-REFERENCE TO RELATED APPLICATION

This application claims priority to Korean Patent Application No. 2009-134578 filed on Dec. 30, 2009, the contents of which are herein incorporated by reference in their entirety.

BACKGROUND

1. Technical Field

The present invention relates to a display apparatus, and more particularly to a display apparatus capable of improving display quality.

2. Discussion of the Related Art

Generally, an active-matrix display apparatus includes row and column drivers to drive dots arranged in the form of a matrix. As the active-matrix display apparatus, a liquid crystal display (LCD), a plasma display panel (PDP), and an organic light emitting diode display (OLED) are used.

In the case of an LCD, three-color dots representing red, green, and blue colors constitute one pixel. Since each of three-color filters provided in each dot transmits about ⅓ of incident light, light efficiency is lowered. An LCD, in which a white dot without a color filter is added to each pixel or a color dot other than the red, green, and blue dots is added to each pixel, has been developed to enhance luminance.

However, if a driving chip, which supports dot inversion for a display apparatus having a pixel that includes red, blue, and green dots, is adapted to the LCD having a pixel that includes four-color dots, the dot inversion is not normally performed. As a result, the image quality of the LCD is degraded.

SUMMARY

Embodiments of the prevent invention provide a display apparatus, in which a dot inversion scheme is adapted to a structure in which each pixel includes four dots, that is, an even number of dots.

According to an embodiment, a display apparatus includes a plurality of pixels, a plurality of data lines, and a plurality of gate lines. The pixels are arranged in first and second directions. Each pixel includes at least one dot. The data lines are provided between two adjacent dots while extending in the first direction. The gate lines are provided between two adjacent dots while extending in the second direction. Among dots arranged in the first direction between an $m^{th}$ data line and an $(m+1)^{th}$ data line, at least one first dot is connected to one of the $m^{th}$ data line and the $(m+1)^{th}$ data line, and at least one second dot is connected to one of an $(m-1)^{th}$ data line and an $(m+2)^{th}$ data line.

According to an embodiment, a display apparatus includes a plurality of pixels, a plurality of data lines, a plurality of gate lines, and a plurality of dummy data lines. The pixels are arranged in first and second directions. Each pixel includes at least one dot. The data lines are provided between two adjacent dots while extending in the first direction. The gate lines are provided between two adjacent dots while extending in the second direction. The dummy data lines are provided between two adjacent dots while extending in the first direction. A $(k-1)^{th}$ dummy data line among the dummy data lines is adjacent to a $k^{th}$ data line, and is electrically connected to a $(k+1)^{th}$ data line, in which k is a natural number greater than or equal to 2

The display quality can be improved in a display apparatus employing the pixel including four dots or the even number of dots.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

Figure 1:
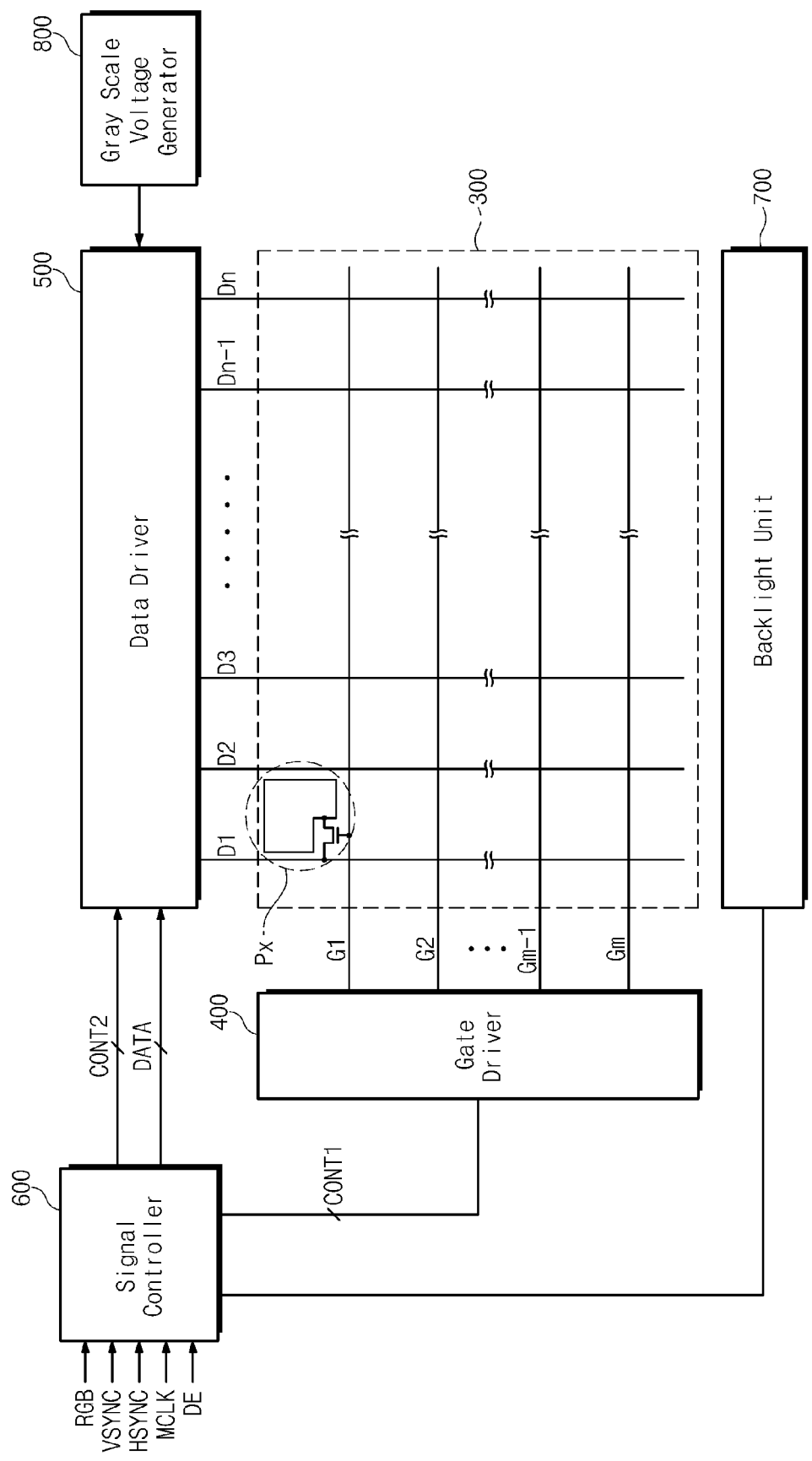
FIG. 1 is a block diagram showing an LCD according to an exemplary embodiment of the present invention.

Hereinafter, embodiments of the present invention will be described with reference to accompanying drawings. The same reference numerals may be assigned to the same elements throughout drawings, and for purposes of brevity, explanation of the elements explained in one embodiment may be omitted in another embodiment.

Hereinafter, a display apparatus according to an embodiment of the present invention will be described in detail with reference to FIGS. 1 and 2, and a liquid crystal display (LCD) will be described as one example.

Figure 2:
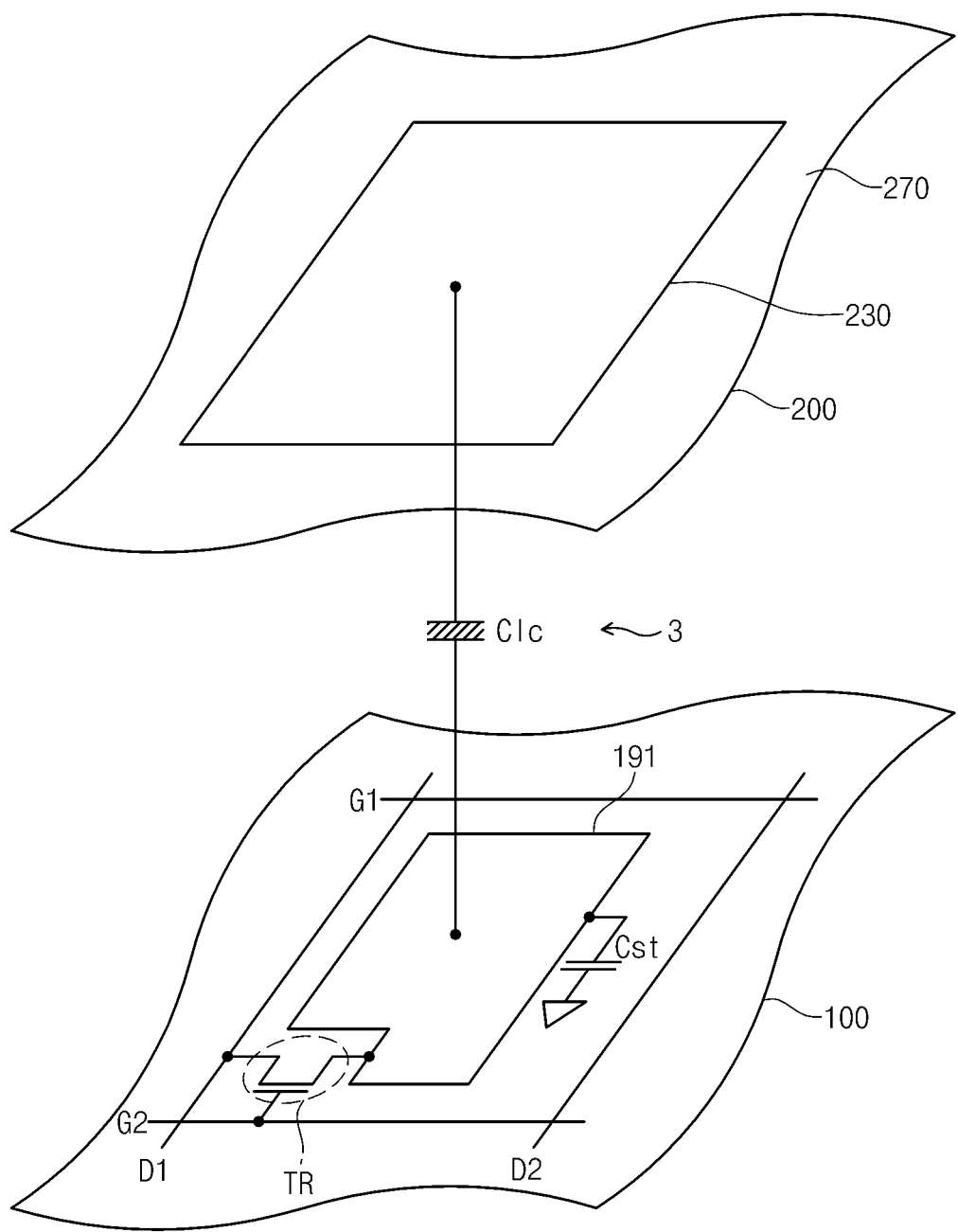
FIG. 2 is an equivalent circuit diagram representing one dot in the LCD according to an exemplary embodiment of the present invention.

FIG. 1 is a block diagram showing an LCD according to an exemplary embodiment of the present invention, and FIG. 2 is an equivalent circuit diagram representing one dot of the LCD shown in FIG. 1.

Referring to FIG. 1, the LCD includes a liquid crystal panel 300, a gate driver 400, a data driver 500, a gray scale voltage generator 800, and a signal controller 600.

Referring to FIG. 1, the liquid crystal panel 300 is connected to a plurality of signal lines G1 to Gm and D1 to Dn in the equivalent circuit, and includes a plurality of dots Px arranged substantially in the form of a matrix. As shown in FIG. 2, the liquid crystal panel 300 includes a lower substrate 100, an upper substrate 200 facing the lower substrate 100, and a liquid crystal layer 3 between the lower and upper substrates 100 and 200.

The signal lines G1 to Gm and D1 to Dn include a plurality of gate lines G1 to Gm to receive gate signals (scan signals) and a plurality of data lines D1 to Dn to receive data voltages. The gate lines G1 to Gm extend in a row direction substantially in parallel to each other, and the data lines D1 to Dn extend in a column direction substantially in parallel to each other.

The dots Px may include switching devices TR connected to the signal lines G1 to Gm and D1 to Dn, liquid crystal capacitors Clc connected to the switching devices TR, and storage capacitors Cst connected to the liquid crystal capacitors Clc in parallel with the liquid crystal capacitors Clc. The storage capacitors Cst may be omitted. The switching devices TR may be provided on the lower substrate 100, and each switching device TR may include a three-terminal device such as a thin film transistor. Each switching device TR may include a control terminal connected to a corresponding gate line of the gate lines G1 to Gm, an input terminal connected to a corresponding data line of the data lines D1 to Dn, and an output terminal connected to a corresponding liquid crystal capacitor of the liquid crystal capacitors Clc and a corresponding storage capacitor of the storage capacitors Cst.

Each liquid crystal capacitor Clc employs a pixel electrode 191 provided on the lower substrate 100 and a common electrode 270 provided on the upper substrate 200 as the two terminals. The liquid crystal layer 3 interposed between the pixel electrode 191 and the common electrode 270 may serve as a dielectric substance. The pixel electrode 191 is connected to the switching device TR. The common electrode 270 is formed on the entire surface of the upper substrate 200 to receive a common voltage. Different from FIG. 2, the common electrode 270 may also be formed on the lower substrate 100. In this case, one of the pixel electrode 191 and the common electrode 270 may have a linear shape or a bar shape.

Each storage capacitor Cst assists the liquid crystal capacitor Clc, and is defined by the pixel electrode 191 and a storage line (not shown) provided on the lower substrate 100 to overlap the pixel electrode 191 while interposing an insulator between the pixel electrode 191 and the storage line. A predetermined voltage such as a common voltage is applied to the storage line. The storage capacitor Cst may also be defined by the pixel electrode 191 of a pixel and a gate line (that is, a previous gate line) of a previous pixel while interposing an insulator between the pixel electrode 191 and the gate line.

The LCD can display desired colors through the combination of a space division scheme and a time division scheme of primary colors, in which the space division scheme is to allow each dot Px to uniquely display one of the primary colors, and the time division scheme is to alternately display the primary colors over time. The primary colors may include three primary colors (e.g., red, green, and blue colors) of light.

The exemplary structure shown in FIG. 2 illustrates the space division scheme. Each dot Px includes a color filter 230 that is provided on a portion of the upper substrate 200 corresponding to the pixel electrode 191 to represent one of the primary colors. Different from FIG. 2, the color filter 230 may also be formed above or below the pixel electrode 191 of the lower substrate 100. The liquid crystal panel 300 may include at least one polarizer (not shown).

Referring to FIG. 1 again, the gray scale voltage generator 800 generates a whole gray scale voltage corresponding to whole gray scales that can be represented in each dot Px, or a gray scale voltage (referred to as "reference gray scale voltage") corresponding to a portion of the whole gray scales. The reference gray scale voltage may have a positive polarity or a negative polarity with respect to the common voltage.

The gate driver 400 is connected to the gate lines G1 to Gm of the liquid crystal panel 300 to apply a gate signal including a combination of a gate-on voltage and a gate-off voltage to the gate lines G1 to Gm.

The data driver 500 is connected to the data lines D1 to Dn of the liquid crystal panel 300 to select a portion of the whole gray scale voltage generated from the gray scale voltage generator 800 and apply the selected gray scale voltage to the data lines D1 to Dn as a data voltage. However, when the gray scale voltage generator 800 supplies the reference gray scale voltage to the data driver 500, the data driver 500 divides the reference gray scale voltage to generate a desired data voltage. A backlight unit 700 supplies light to the liquid crystal panel 300. The signal controller 600 controls the operation of the gate driver 400, the data driver 500, and the backlight unit 700.

Each of the signal controller 600, the gate driver 400, and the data driver 500 may be directly mounted on the liquid crystal panel 300 in the form of at least one IC chip, or mounted on a flexible printed circuit film (not shown) that is attached to the liquid crystal panel 300 in the form of a tape carrier package (TCP). In addition, the signal controller 600, the gate driver 400, and the data driver 500 may also be mounted on a separate printed circuit board (not shown). Furthermore, the gate driver 400 and the data driver 500 may also be integrated on the liquid crystal panel 300 together with the signal lines G1 to Gm and D1 to Dn and the switching devices TR through a thin film process. The signal controller 600, the gate driver 400, and the data driver 500 can also be integrated in the form of a single chip. At least one of the signal controller 600, the gate driver 400, and the data driver 500 or at least one of a circuit device including the signal controller 600, a circuit device including the gate driver 400, and a circuit device including the data driver 500 can also be provided outside the single chip.

Hereinafter, the operational procedure of such an LCD will be described in detail.

The signal controller 600 receives an input image signal RGB from an external graphic controller (not shown) and receives input control signals to control the display of the input image signal RGB. The input image signal RGB contains information about luminance of each dot Px, which can be represented in 1024 ($=2^{10}$), 256 ($=2^8$), or 64 ($=2^6$) gray scales. The input control signals may include a vertical synchronization signal Vsync, a horizontal synchronization signal Hsync, a main clock signal MCLK, and a data enable signal DE.

The signal controller 600 processes the input image signal RGB to be suitable for the operating condition of the liquid crystal panel 300 based on the input image signal RGB and the input control signals, thereby generating an image signal DATA, a gate control signal CONT1, and a data control signal CONT2. The gate control signal CONT1 is provided to the gate driver 400, and the data control signal CONT2 and the image signal DATA are provided to the data driver 500.

The gate control signal CONT1 includes a scanning start signal to instruct the starting of a scanning operation and at least one clock signal to control an output period of the gate-on voltage. The gate control signal CONT1 may further include an output enable signal to restrict the duration of the gate-on voltage.

The data control signal CONT2 may include a horizontal start time to notify the start of the transmission of the image signal DATA for a row of dots Px to the data driver 500 and a load signal to instruct the application of the data voltage to the data lines D1 to Dn. The data control signal CONT2 may further include a reversion signal RVS to reverse the polarity of the data voltage with respect to the common voltage.

The data driver 500 receives the image signal DATA and selects a gray scale voltage corresponding to the image signal DATA, thereby generating an analog data voltage and applying the analog data voltage to the data lines D1 to Dn.

The gate driver 400 turns on the switching devices TR connected with the gate lines G1 to Gm by applying the gate-on voltage to the gate lines G1 to Gm according to the gate control signal CONT1 transmitted from the signal controller 600. The data voltage, which has been applied to the data lines D1 to Dn, is applied to an appropriate dot Px through the turned-on switching device TR.

The difference between the data voltage applied to the dot Px and the common voltage is represented as a charge voltage of the liquid crystal capacitor Clc, that is, a pixel voltage. The alignment of liquid crystal molecules is changed depending on the magnitude of the pixel voltage, so that the liquid crystal layer 3 transmits light emitted from the backlight unit 700. The polarization of light transmitted through the liquid crystal layer 3 varies according to the alignment of the liquid crystal molecules, and such variation of the polarization is represented as variation of the light transmittance by the polarizer. As a result, the dot Px represents the gray scales of the image signal DATA. The data voltage may be a positive data voltage higher than the common voltage, or a negative data voltage lower than the common voltage.

The above procedure is repeated in the unit of one horizontal period (1 H) (which is identical to one period of the horizontal synchronization signal Hsync and the data enable signal DE), so that the gate-on voltage is sequentially applied to all of the gate lines G1 to Gm, and the data voltage is applied to all dots Px, thereby displaying one frame image.

The polarity of the data voltage applied to each pixel is reversed after the operation for one frame has been finished and before the operation for a next frame is started to prevent liquid crystal from being degraded. In other words, the polarity of the data voltage may be reversed in one frame unit in response to the reversion signal applied to the data driver 500. In order to improve image quality when displaying one frame image, the liquid crystal panel 300 may be driven through a column inversion scheme to apply a data voltage having an opposite polarity to an adjacent data line or a dot inversion scheme to apply a data voltage having an opposite polarity to an adjacent dot.

The backlight unit 700 includes a backlight to supply light to the liquid crystal and an inverter to supply a current to the backlight. An inverter driving signal may be synchronized with a synchronization signal of an image.

Figure 3:
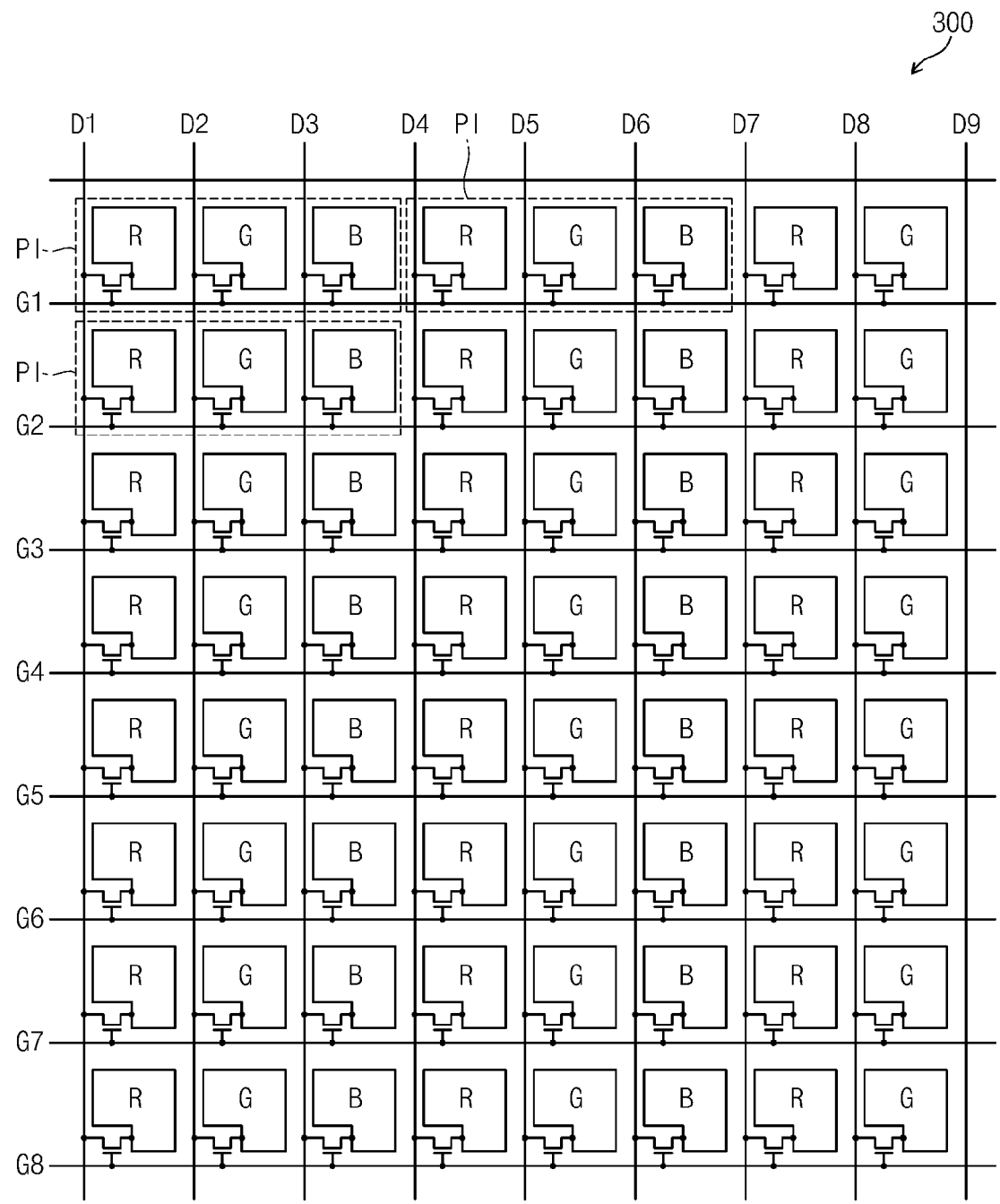
FIG. 3 is a circuit diagram showing the dot arrangement of a liquid crystal panel according to an exemplary embodiment of the present invention.
Figure 4:
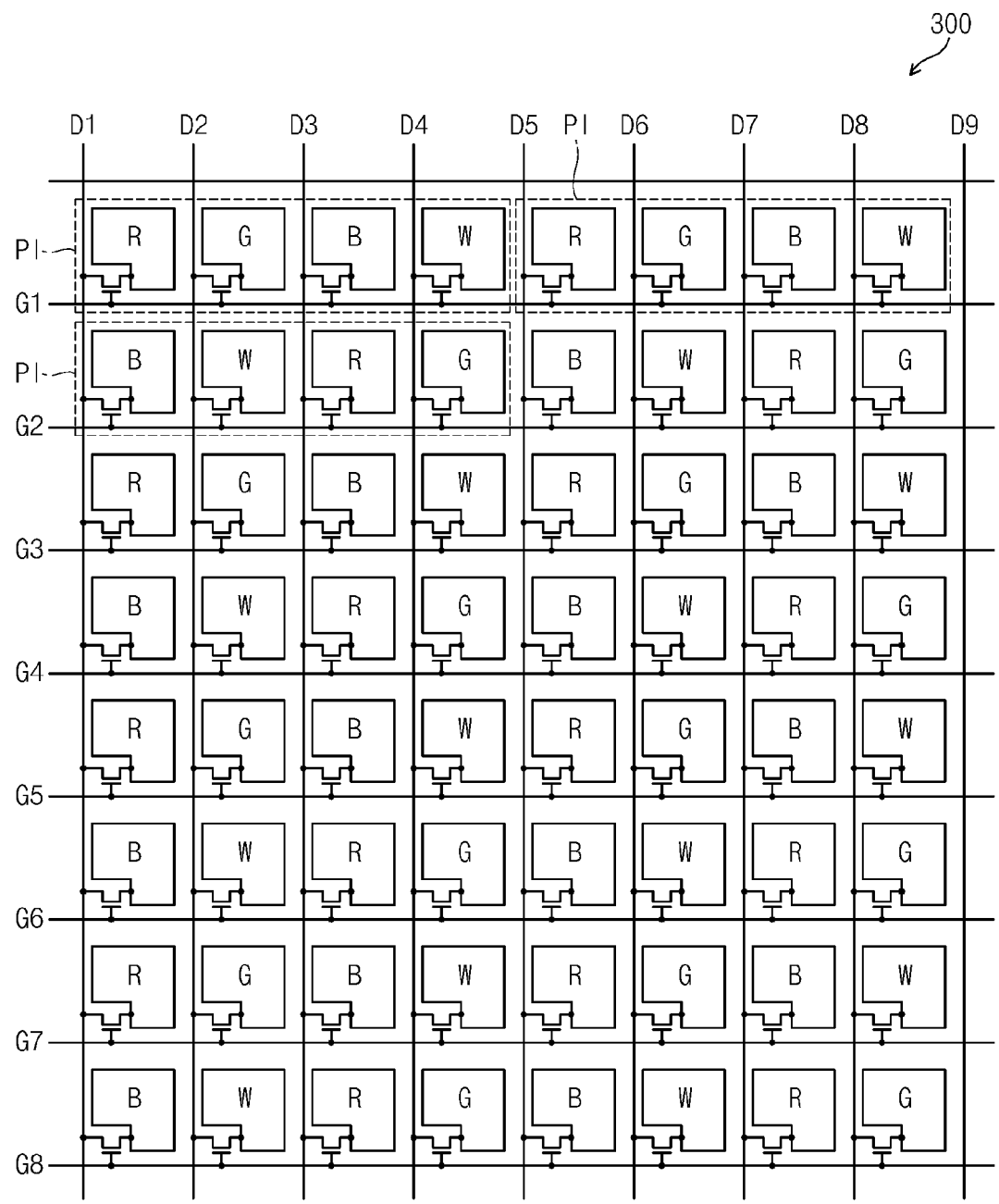
FIG. 4 is a circuit diagram showing the dot arrangement of a liquid crystal panel according to an exemplary embodiment of the present invention.

FIG. 3 is a circuit diagram showing the dot arrangement of the liquid crystal panel 300 according to an exemplary embodiment of the present invention, and FIG. 4 is a circuit diagram showing the dot arrangement of the liquid crystal panel 300 according to an exemplary embodiment of the present invention.

Referring to FIG. 3, each dot can represent one of red (R), green (G), and blue (B) colors. Three dots representing the R, G, and B colors may constitute one pixel PI. The dots constituting each pixel PI may be arranged in a row direction in which the gate lines G1 to Gm extend. The liquid crystal panel 300 may include a plurality of pixels PI repeatedly arranged in the row direction in which the gate lines G1 to Gm extend or in a column direction in which the data lines D1 to Dn extend.

Referring to FIG. 4, the liquid crystal panel 300 may include dots each representing one of red, green, blue, and white colors R, G, B, and W. The dots representing the R, G, B, and W colors may constitute one pixel PI. The dots constituting each pixel PI may be arranged in the extension direction of the gate lines G1 to Gm. The liquid crystal panel 300 may include a plurality of pixels PI repeatedly arranged in the row direction in which the gate lines G1 to Gm extend or in the column direction in which the data lines D1 to Dn extend.

Figure 5:
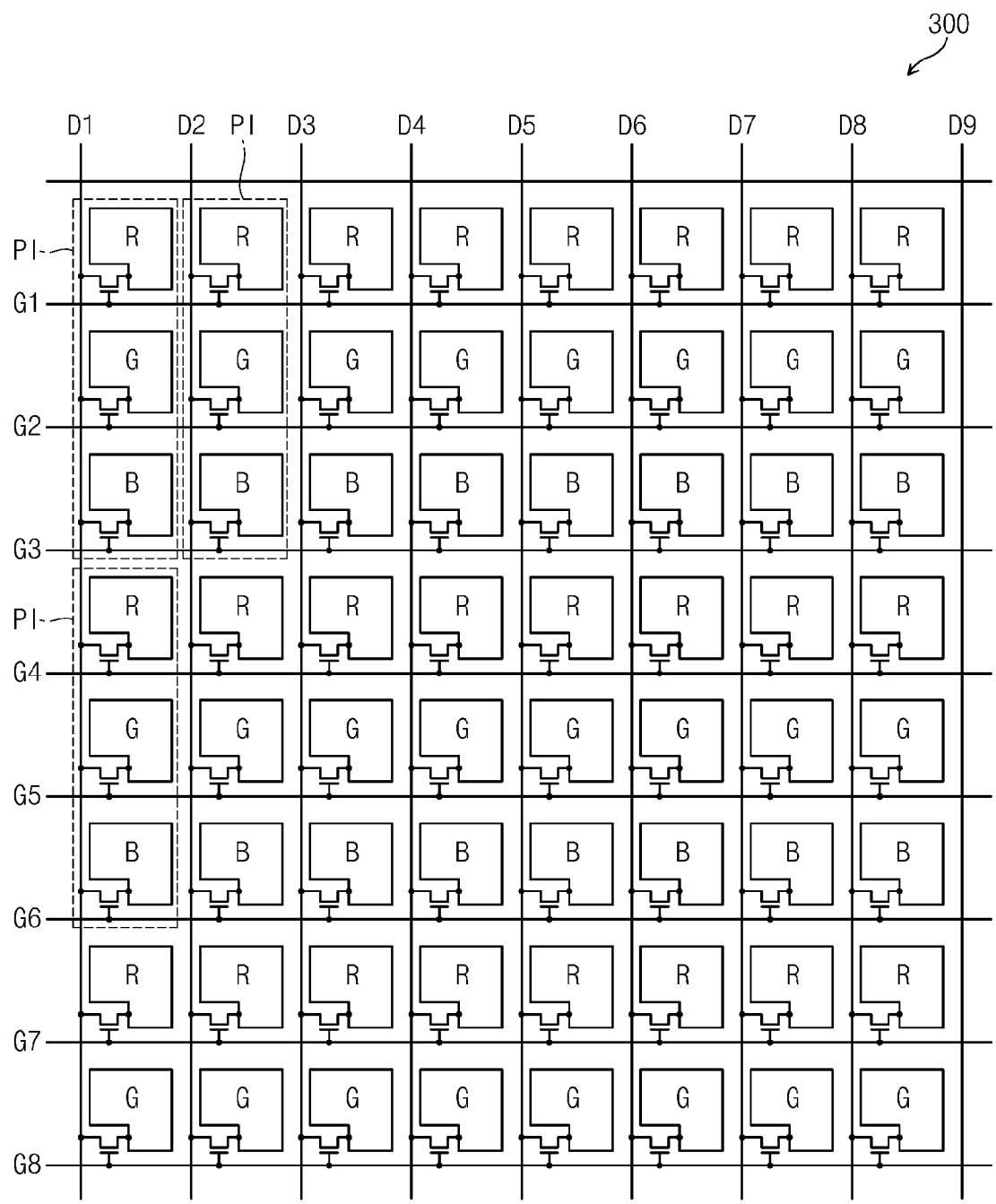
FIG. 5 is a circuit diagram showing the dot arrangement of a liquid crystal panel according to an exemplary embodiment of the present invention.
Figure 6:
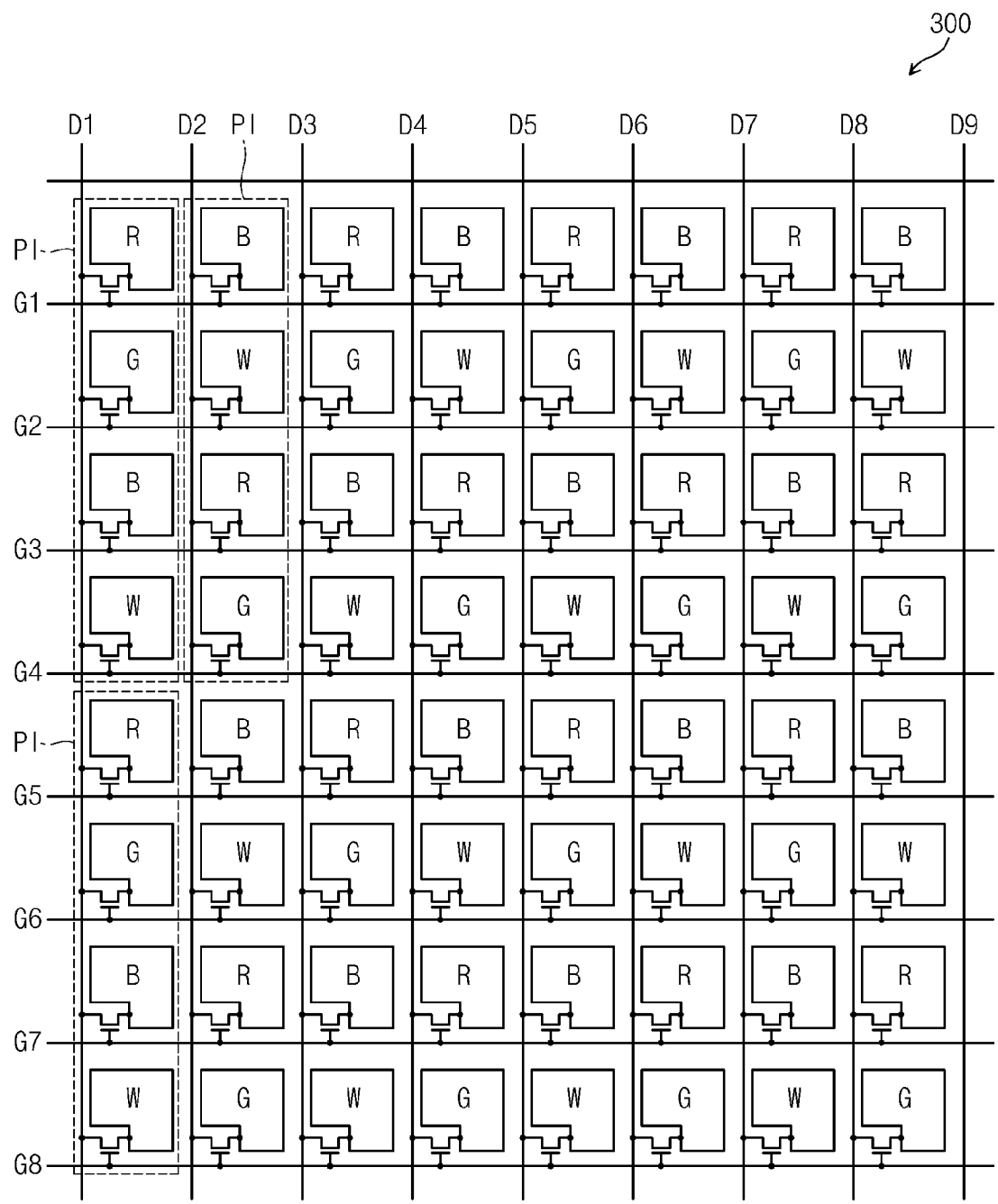
FIG. 6 is a circuit diagram showing the dot arrangement of a liquid crystal panel according to an exemplary embodiment of the present invention.

FIG. 5 is a circuit diagram showing the dot arrangement of the liquid crystal panel 300 according to an exemplary embodiment of the present invention, and FIG. 6 is a circuit diagram showing the dot arrangement of the liquid crystal panel 300 according to an exemplary embodiment of the present invention.

Referring to FIG. 5, each dot may represent one of primary colors including R, G, and B colors. Three dots representing R, G, and B colors may constitute one pixel PI. The dots of the pixel PI may be arranged in the column direction in which the data lines D1 to Dn extend. The liquid crystal panel 300 may include a plurality of pixels PI repeatedly arranged in the row direction in which the gate lines G1 to Gm extend or in the column direction in which the data lines D1 to Dn extend.

Referring to FIG. 6, the liquid crystal panel 300 may include dots each representing one of R, G, B, and W colors. The dots representing the R, B, and W colors may constitute one pixel PI. The dots constituting each pixel PI may be arranged in the column direction in which the data lines D1 to Dn extend. The liquid crystal panel 300 may include a plurality of pixels PI repeatedly arranged in the row direction in which the gate lines G1 to Gm extend or in the column direction in which the data lines D1 to Dn extend.

Figure 7:
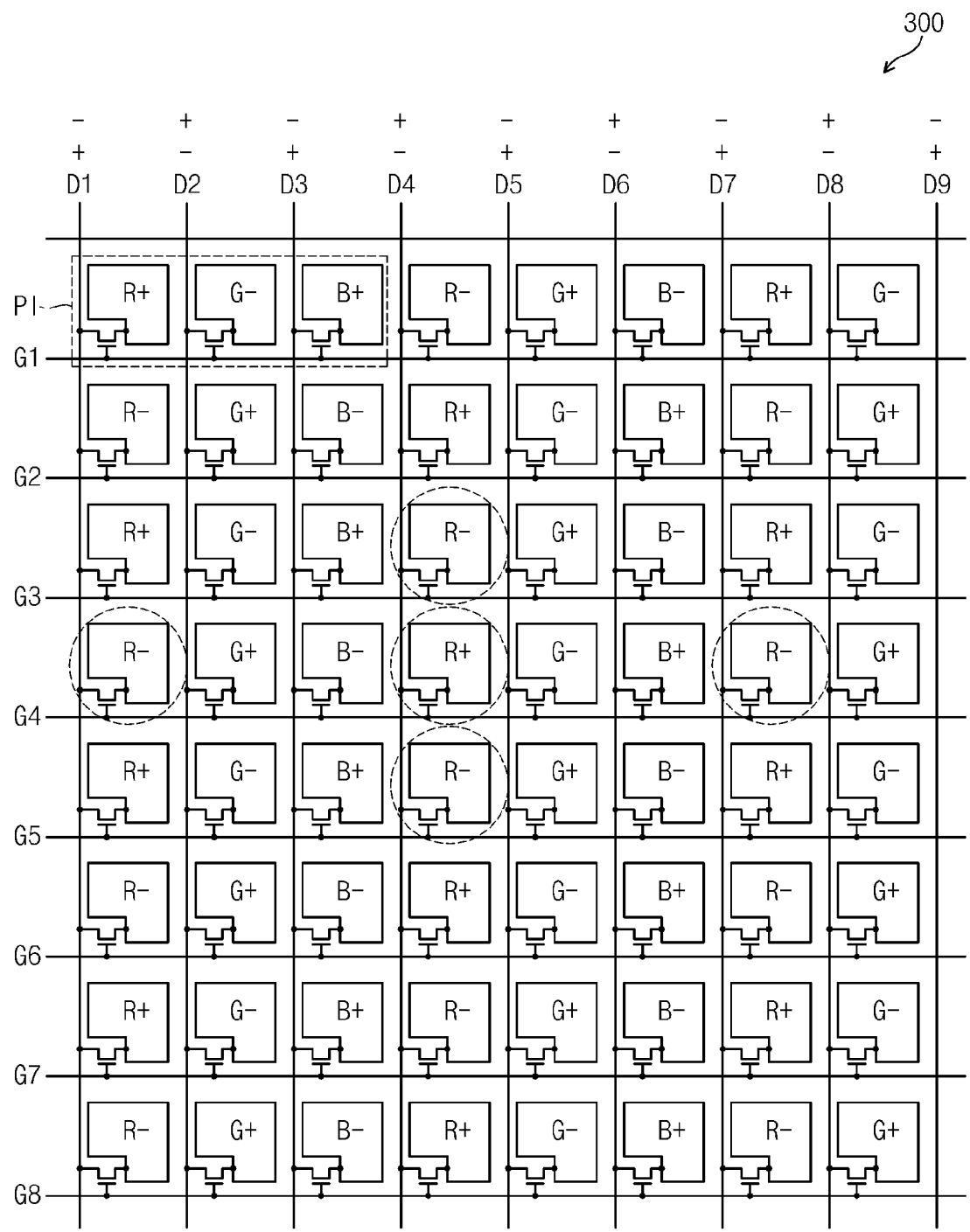
FIG. 7 is a circuit diagram showing a polarity of a data voltage applied to each dot in the liquid crystal panel shown in FIG. 3.
Figure 8:
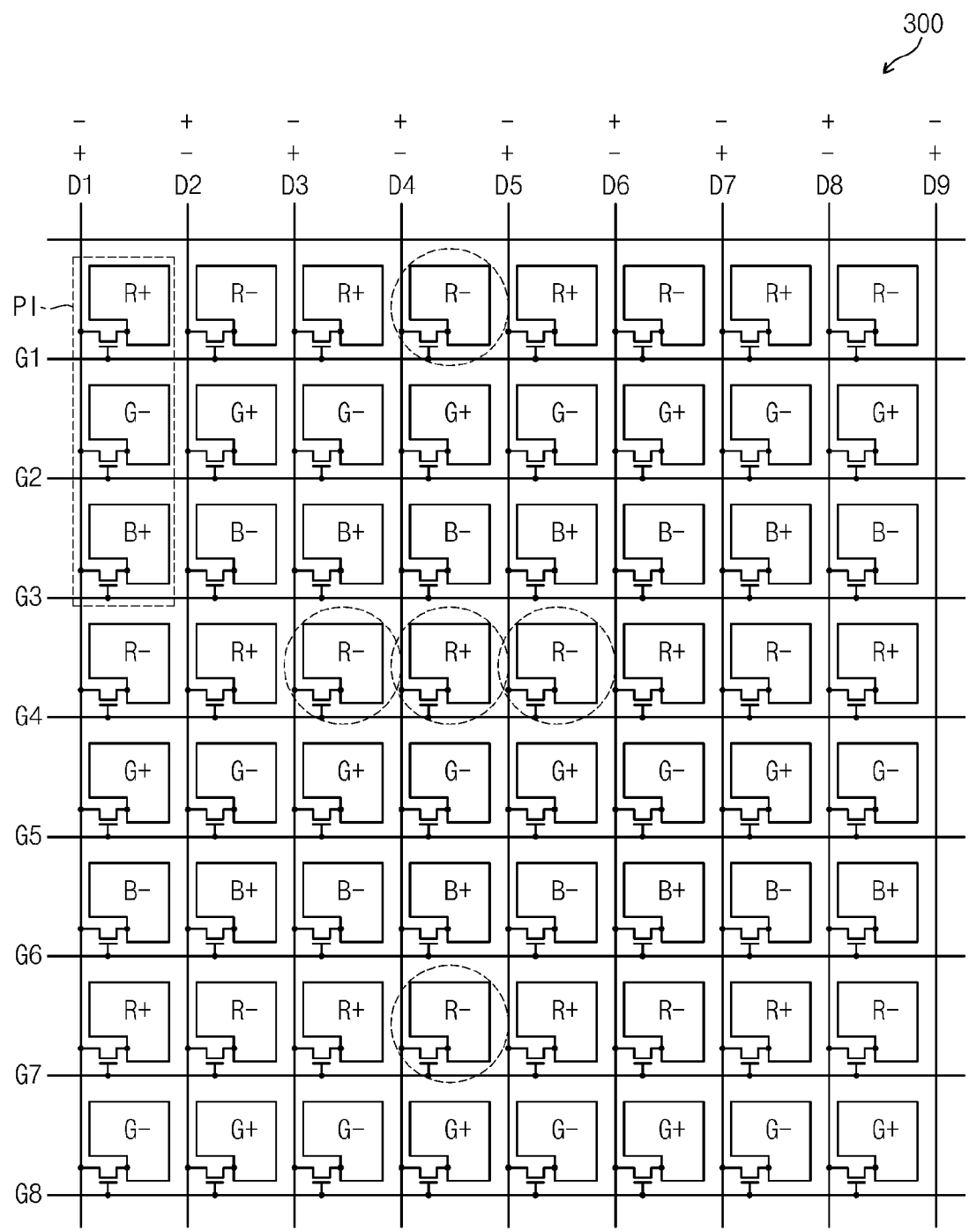
FIG. 8 is a circuit diagram showing a polarity of a data voltage applied to each dot in the liquid crystal panel shown in FIG. 5.

FIG. 7 is a circuit diagram showing the polarity of the data voltage applied to each dot in the liquid crystal panel 300 shown in FIG. 3. FIG. 8 is a circuit diagram showing the polarity of the data voltage applied to each dot in the liquid crystal panel 300 shown in FIG. 5.

Referring to FIGS. 7 and 8, a dot marked as 'R+' represents a red dot having a positive data voltage, and a dot marked as 'R−' represents a red dot having a negative data voltage. A dot marked as 'G+' represents a green dot having a positive data voltage, and a dot marked as 'G−' represents a green dot having a negative data voltage. A dot marked as 'B+' represents a blue dot having a positive data voltage, and a dot marked as 'B−' represents a blue dot having a negative data voltage.

As shown in FIGS. 7 and 8, among dots constituting pixels PIs adjacent to each other in the row direction or the column direction, dots representing the same color have data voltages of opposite polarities. In this case, a dot having a positive data voltage and a dot having a negative positive voltage may be regularly arranged with respect to one primary color. Accordingly, when a single color is expressed, a vertical or horizontal strip may be prevented from being displayed.

In order to reverse the polarity of the data voltage on a per-dot basis as described above, the data driver 500 alternately outputs a positive data voltage and a negative data voltage to two adjacent data lines, respectively, and reverses the polarity of the data voltage output through one data line on a per-gate line basis.

However, if the above dot inversion scheme is adapted to the four-color liquid crystal panel 300 in which a pixel includes red, green, blue, and white dots, all of the dots representing the same color in each dot row or in each dot column receive data voltage having the same polarity. As a result, a vertical or horizontal stripe may appear on the four-color liquid crystal panel 300, thus deteriorating image quality.

Hereinafter, with reference to FIGS. 9 to 13, description will be made regarding a case in which the four-color liquid crystal panel 300 of which each pixel has red, green, blue, and white dots operates in a column inversion scheme.

Figure 9:
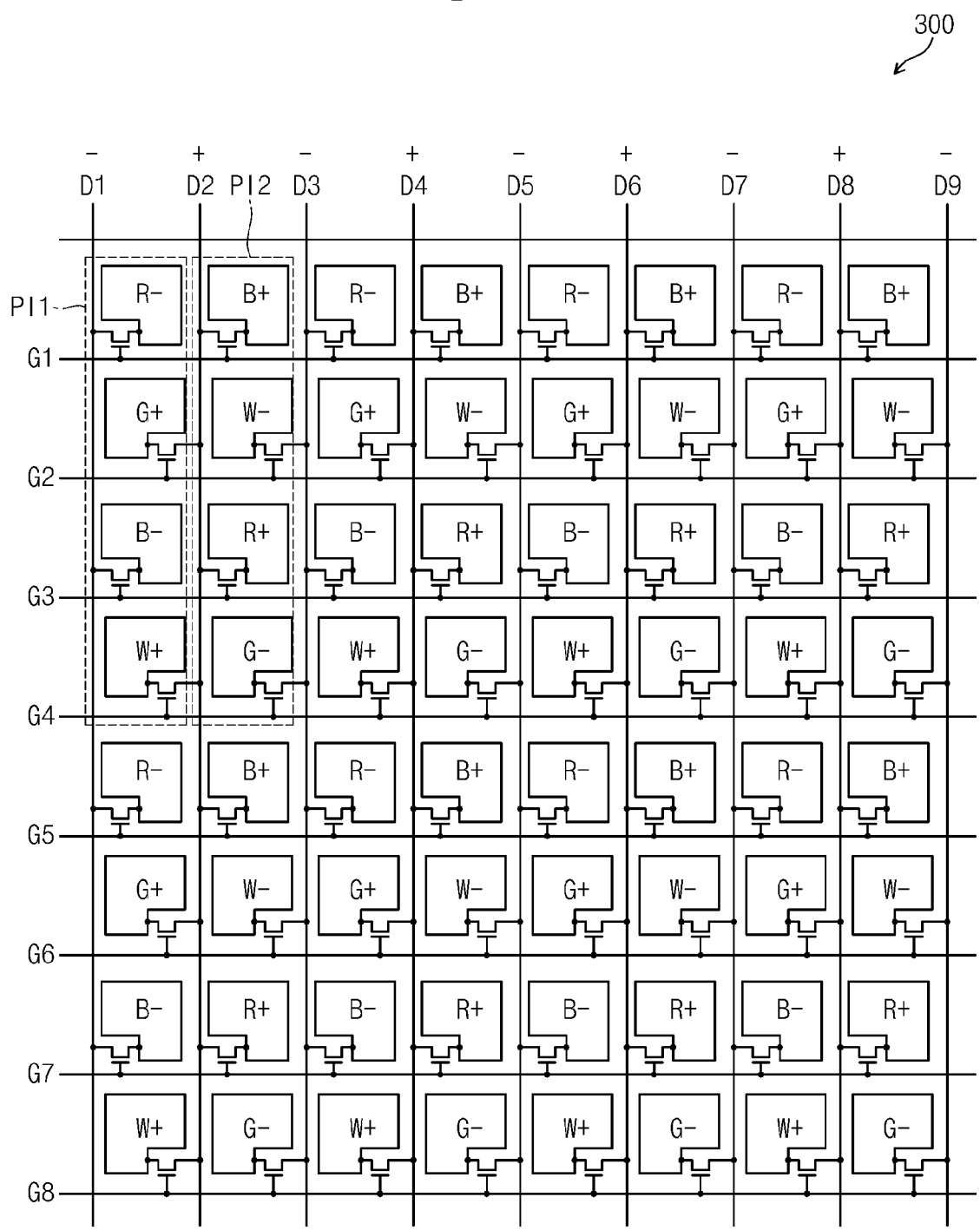
FIG. 9 is a circuit diagram showing the dot arrangement of a liquid crystal panel according to an exemplary embodiment of the present invention and a polarity of a data voltage applied to each dot.

FIG. 9 is a circuit diagram showing the dot arrangement of the liquid crystal panel 300 according to another exemplary embodiment of the present invention and the polarity of a data voltage applied to each dot.

Referring to FIG. 9, each dot can represent one of R, G, B, and W colors. Four dots representing the R, G, B, and W colors, respectively, constitute one pixel. In particular, the liquid crystal panel 300 includes a plurality of first pixels PI1 and a plurality of second pixels PI2. Each first pixel PI1 includes red, green, blue, and white dots, and each second pixel PI2 includes red, green, blue, and white dots.

The dots of the first pixel PI1 are arranged in the order of R, G, B, and W in the column direction, and the dots of the second pixel PI2 are arranged in the order of B, W, R, and G in the column direction. At least one pixel column of the liquid crystal panel 300 includes the first pixels PI1, and a pixel column adjacent to the pixel column including the first pixels PI1 may include the second pixels PI2.

As shown in FIG. 9, a dot marked as 'R+' represents a red dot having a positive data voltage, and a dot marked as 'R−' represents a red dot having a negative data voltage. A dot marked as 'G+' represents a green dot having a positive data voltage, and a dot marked as 'G−' represents a green dot having a negative data voltage. A dot marked as 'B+' represents a blue dot having a positive data voltage, and a dot marked as 'B −' represents a blue dot having a negative data voltage. A dot marked as 'W+' represents a white dot having a positive data voltage, and a dot marked as 'W−' represents a white dot having a negative data voltage.

Referring to FIG. 9, dots arranged in an odd-numbered dot row among a plurality of dot rows may be electrically connected to an adjacent data line provided at the left side of the dots, and dots arranged in an even-numbered dot row may be electrically connected to an adjacent data line provided at the right side of the dots. In this case, two adjacent data lines receive data voltages having different polarities from the data driver 500.

When the dots are arranged as described above, even if the liquid crystal panel 300 is driven in a column inversion scheme to reverse the polarity of a data voltage on a per-data line basis, the polarities of dots can be reversed every one dot.

Figure 10:
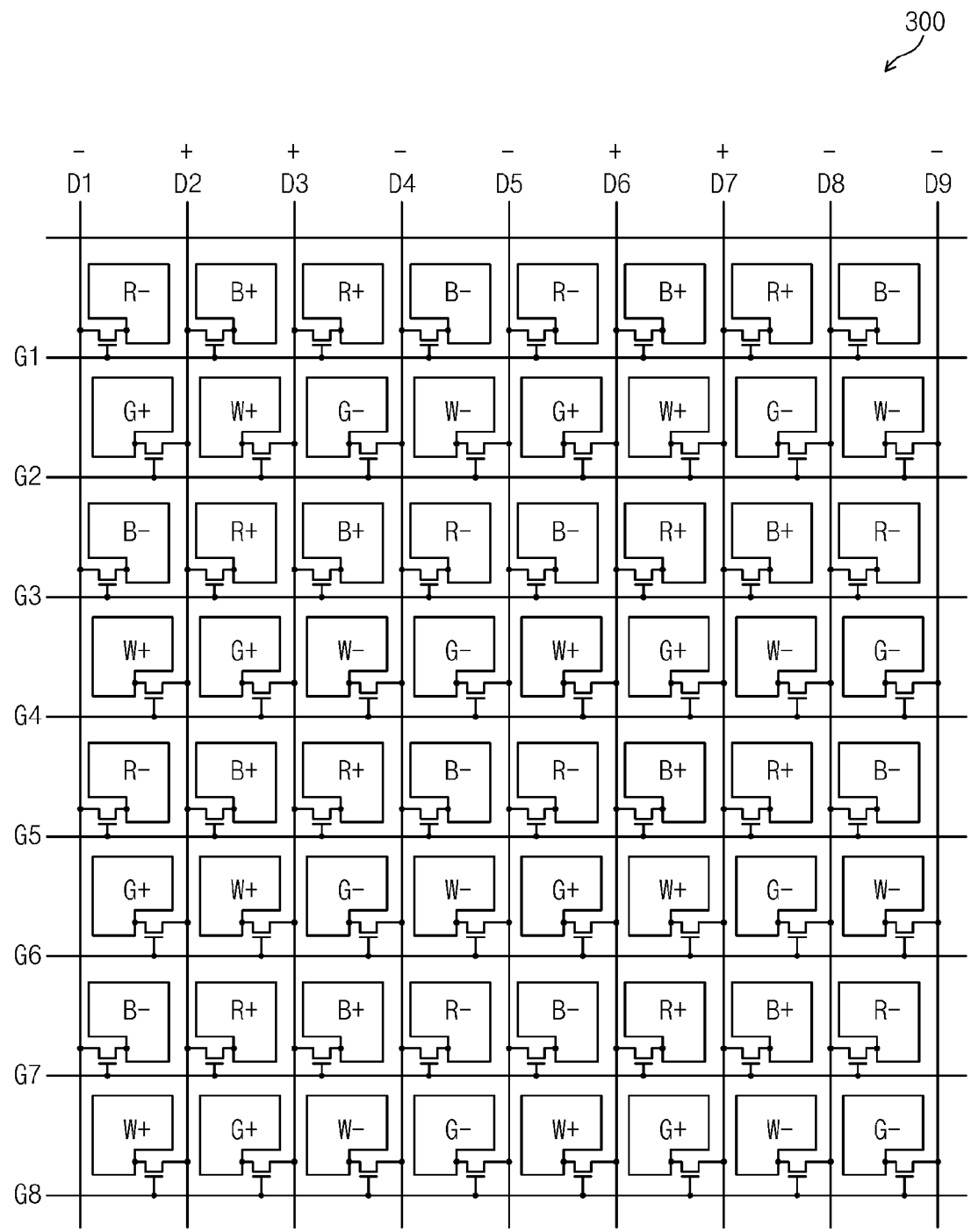
FIG. 10 is a circuit diagram showing polarities of data voltages applied to dots of the liquid crystal panel shown in FIG. 9.

FIG. 10 is a circuit diagram showing the polarities of data voltages applied to dots of the liquid crystal panel 300 shown in FIG. 9.

Referring to FIG. 10, dots arranged in an odd-numbered dot row among a plurality of dot rows may be electrically connected to an adjacent data line provided at the left side of the dots, and dots arranged in an even-numbered dot row may be electrically connected to an adjacent line provided at the right side of the dots. In this case, the data driver 500 outputs data voltages in the sequence of a positive polarity (+), a positive polarity (+), a negative polarity (−), and a negative polarity (−) to four adjacent data lines such as, for example, data lines D2, D3, D4, and D5, thereby driving a plurality of dots. Accordingly, the polarities of the dots can reversed every two dots in the row direction, and reversed every one dot in the column direction.

Figure 11:
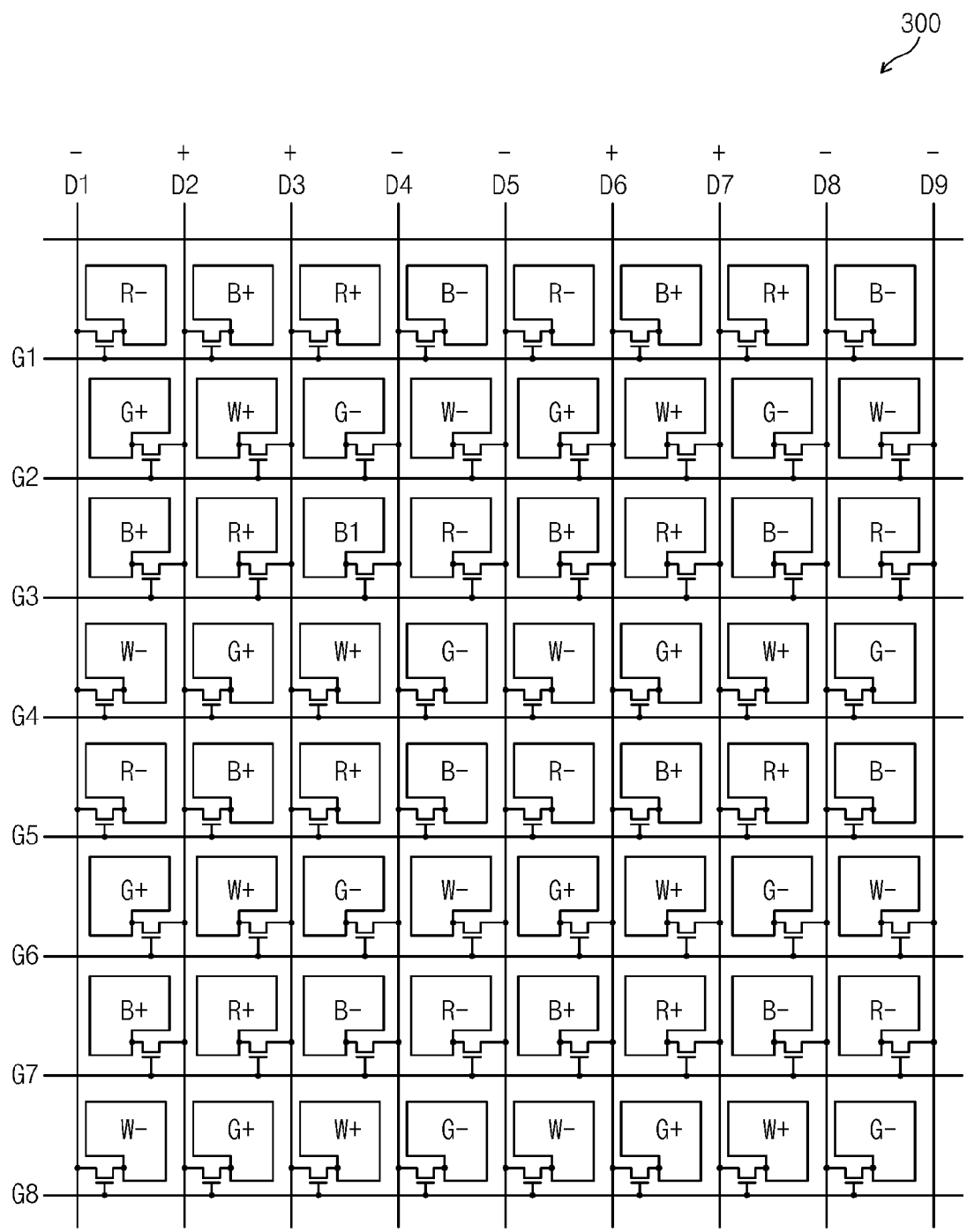
FIG. 11 is a circuit diagram showing the dot arrangement of a liquid crystal panel according to an exemplary embodiment of the present invention and a polarity of a data voltage applied to each dot.

FIG. 11 is a circuit diagram showing the dot arrangement of the liquid crystal panel 300 according to another exemplary embodiment of the present invention and the polarity of a data voltage applied to each dot.

Referring to FIG. 11, dots arranged in first and second dot rows among four adjacent dot rows such as, for example, rows connected to gate lines G4, G5, G6, and G7 are electrically connected to data lines adjacent to the left side of the dots, and dots arranged in the third and fourth dot rows are electrically connected to data lines adjacent to the right side of the dots. In this case, the data driver 500 outputs data voltages in the sequence of a positive polarity (+), a positive polarity (+), a negative polarity (−), and a negative polarity (−) to four adjacent data lines such as, for, example, data lines D2, D3, D4, and D5, thereby driving a plurality of dots. Accordingly, the polarity of the dots is reversed every two dots in the row and column directions.

Figure 12:
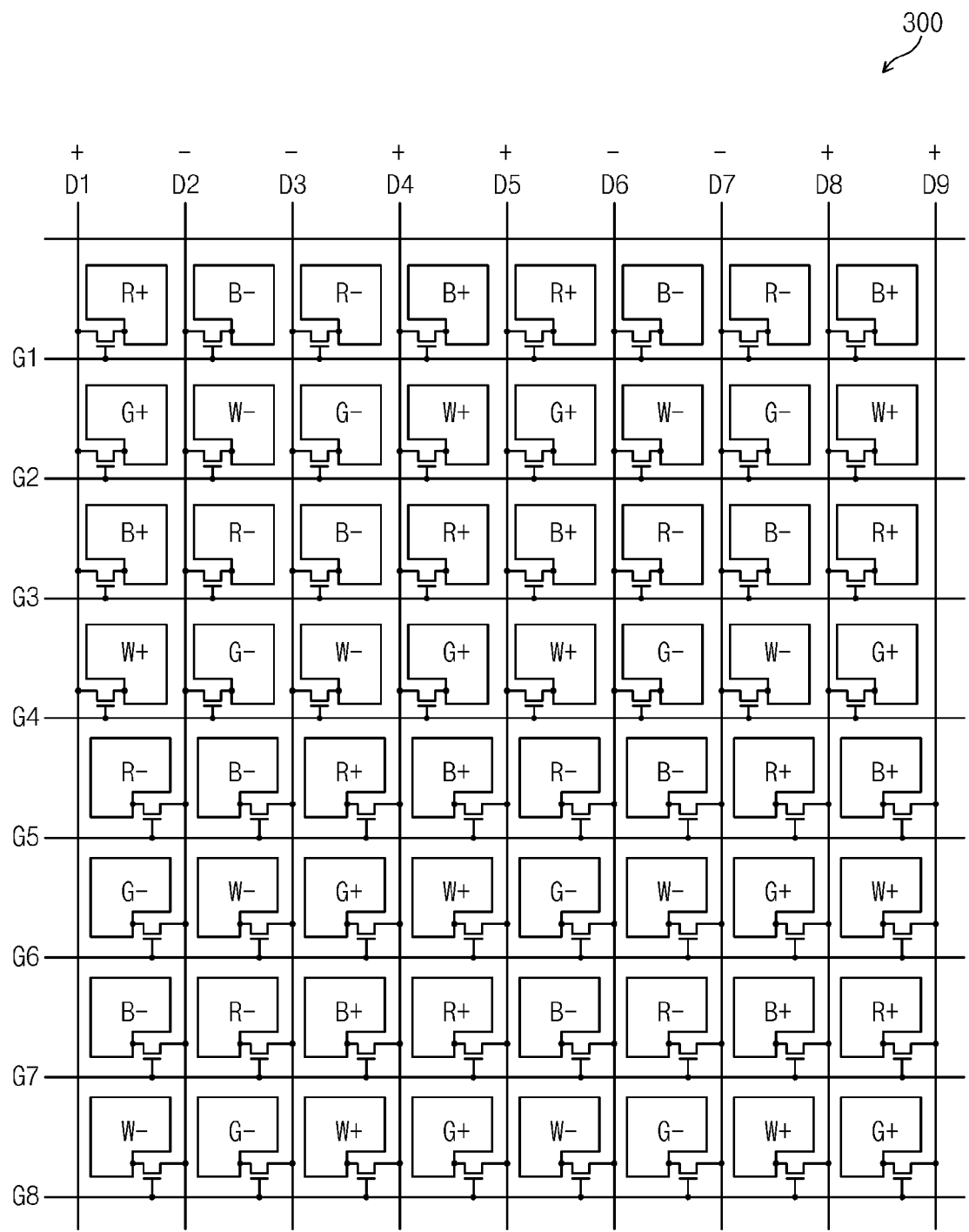
FIG. 12 is a circuit diagram showing the dot arrangement of a liquid crystal panel according to an exemplary embodiment of the present invention and a polarity of data voltage applied to each dot.

FIG. 12 is a circuit diagram showing the dot arrangement of the liquid crystal panel 300 according to an exemplary embodiment of the present invention and the polarity of data voltage applied to each dot.

Referring to FIG. 12, dots arranged in four adjacent dot rows from the top down are electrically connected to the data lines provided in the left side of the dots, and dots arranged in four next dot rows are electrically connected to data lines provided in the right side of the dots.

In this case, the data driver outputs data voltages of a positive polarity (+), a positive polarity (+), a negative polarity (−), and a negative polarity (−) to four adjacent data lines such as, for example, data lines D4, D5, D6, and D7, thereby driving a plurality of dots. The polarity of the dots is reversed every two dots in the row direction, and every four dots in the column direction.

Figure 13:
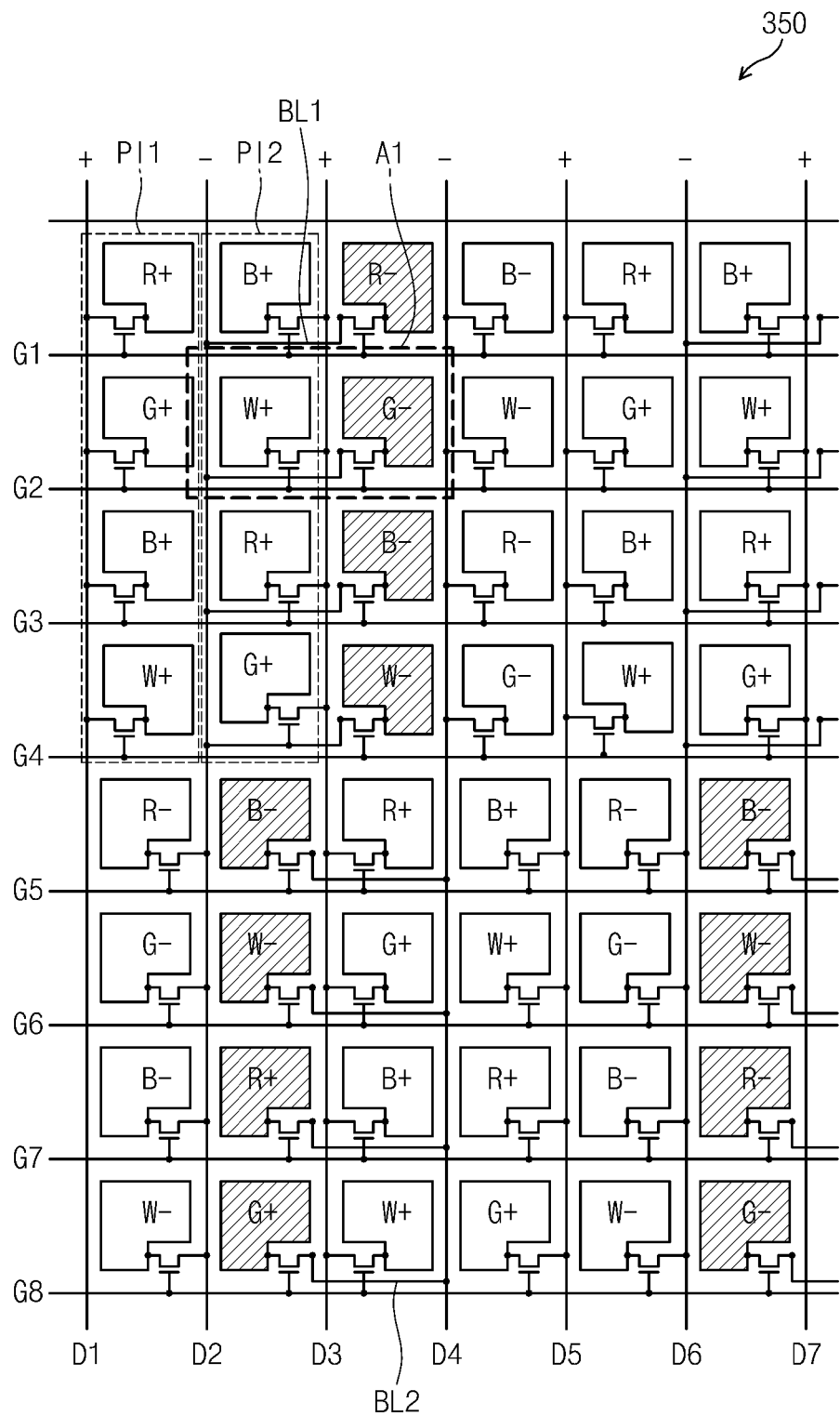
FIG. 13 is a circuit diagram showing the dot arrangement of a liquid crystal panel according to an exemplary embodiment of the present invention and a polarity of data voltage applied to each dot.

FIG. 13 is a circuit diagram showing the dot arrangement of a liquid crystal panel 350 according to an exemplary embodiment of the present invention and the polarity of data voltage applied to each dot.

Referring to FIG. 13, each dot may represent one of primary colors of R, G, B, and W colors. The dots representing R, G, B, and W colors may constitute one pixel. Two dots of the dots constituting the pixel are adjacent to each other in a $p^{th}$ dot row (p is a natural number of 1 or more), and the remaining two dots are adjacent to each other in a $(p+1)^{th}$ dot row. The liquid crystal panel 350 may include a plurality of pixels repeatedly arranged in the row direction or in the column direction.

A dot marked as 'R+' represents a red dot having a positive data voltage, and a dot marked as 'R−' represents a red dot having a negative data voltage. A dot marked as 'G+' represents a green dot having a positive data voltage, and a dot marked as 'G−' represents a green dot having a negative data voltage. A dot marked as 'B+' represents a blue dot having a positive data voltage, and a dot marked as 'B −' represents a blue dot having a negative data voltage. A dot marked as 'W+' represents a white dot having a positive data voltage, and a dot marked as 'W−' represents a white dot having a negative data voltage.

Referring to FIG. 13, the liquid crystal panel 350 includes a plurality of first pixels PI1 and a plurality of second pixels PI2. The first and second pixels PI1 and PI2 include red, green, blue, and white dots.

The dots of each first pixel PI1 are arranged in the sequence of R, G, B, and W colors along the column direction, and the dots of each pixel PI2 are arranged in the sequence of B, W, R, and G colors along the column direction. At least one pixel column of the liquid crystal panel 350 includes the first pixels PI1, and a pixel column adjacent to the above pixel column, which includes the first pixels PI1, includes the second pixels PI2s.

In order to improve image quality of the LCD, a positive first pixel to receive a positive data voltage is alternately arranged with a negative first pixel to receive a negative data voltage in the pixel column including the first pixels PI1. A positive second pixel to receive a positive data voltage is alternately arranged with a negative second pixel to receive a negative data voltage in the pixel column including the second pixels PI2.

Further, in the liquid crystal panel 350, the first pixels PI1 are alternately arranged with the second pixels PI2 in the row direction. The first pixels PH adjacent to each other in the row direction alternately receive a positive data voltage and a negative data voltage, and the second pixels PI2 adjacent to each other in the row direction alternately receive positive and negative data voltages.

As shown in FIG. 13, the liquid crystal panel 350 is driven in the column inversion scheme to apply data voltages having different polarities to two adjacent data lines. Dots (forming $m^{th}$ dot column, where m is a natural number of 2 or more) are arranged in the column direction between two adjacent data lines, for example, an $m^{th}$ data line and an $(m+1)^{th}$ data line. At least one first dot arranged in the $m^{th}$ dot column is connected to one of the $m^{th}$ data line and the $(m+1)^{th}$ data line. In addition, at least one second dot arranged in the $m^{th}$ dot column is connected to one of a data line adjacent to the $m^{th}$ data line and a data line adjacent to the $(m+1)^{th}$ data line.

In detail, if the first dots are connected to the $m^{th}$ data line, the second dots are connected to the $(m-1)^{th}$ data line. According to an exemplary embodiment, as shown in FIG. 13, among dots arranged in a third dot column between third and fourth data lines D3 and D4, the first dots (R+, G+, B+, and W+) are connected to the third data line D3, and the second dots (R−, G−, B−, and W−) are connected to the second data line D2. In the $m^{th}$ dot column, the first dots may be alternately arranged with the second dots in the unit of at least one dot. According to an exemplary embodiment, as shown in FIG. 13, the first dots are alternately arranged with the second dots in the unit of four dots along the $m^{th}$ dot column.

The liquid crystal panel 350 further includes first bridge lines BL1 electrically connecting the second dots to the $(m-1)^{th}$ data line.

If the first dots are connected to the $(m+1)^{th}$ data line, the second dots are connected to an $(m+2)^{th}$ data line. According to an present exemplary embodiment, as shown in FIG. 13, among dots arranged in the second dot column between the second and third data lines D2 and D3, the first dots (B+, W+, R+, and G+) are connected to the third data line D3, and the second dots (B−, W−, and R−, and G−) are connected to the fourth data line D4. The first and second dots may be alternately arranged with each other in the unit of at least one dot along the $(m-1)^{th}$ dot column. As an example, as shown in FIG. 13, the first and second dots are alternately arranged with each other in the unit of four dots along the $(m-1)^{th}$ dot column.

The liquid crystal panel 350 further includes second bridge lines BL2 to electrically connect the second dots to the $(m+2)^{th}$ data line.

Referring to FIG. 13, the liquid crystal panel 350 includes dots (that is, $n^{th}$ dot column, where n is a natural number different from the m) arranged between an $n^{th}$ data line and an $(n+1)^{th}$ data line in the column direction. At least one first dot of the $n^{th}$ dot column is connected to the $n^{th}$ data line, and at least one second dot of the $n^{th}$ dot column is connected to the $(m+1)^{th}$ data line.

In detail, as shown in FIG. 13, among dots of the first dot column between the first and second data lines D1 and D2, the first dots (R+, G+, B+, and W+) are connected to the first data line D1, and the second dots (R−, G−, B−, and W−) are connected to the second data line D2.

In the $n^{th}$ dot column, the first dots and the second dots may be alternately arranged with each other in the unit of at least one dot. According to an exemplary embodiment, as shown in FIG. 13, the first dots and the second dots may be alternately arranged with each other in the unit of four dots in the $n^{th}$ dot column.

Figure 14:
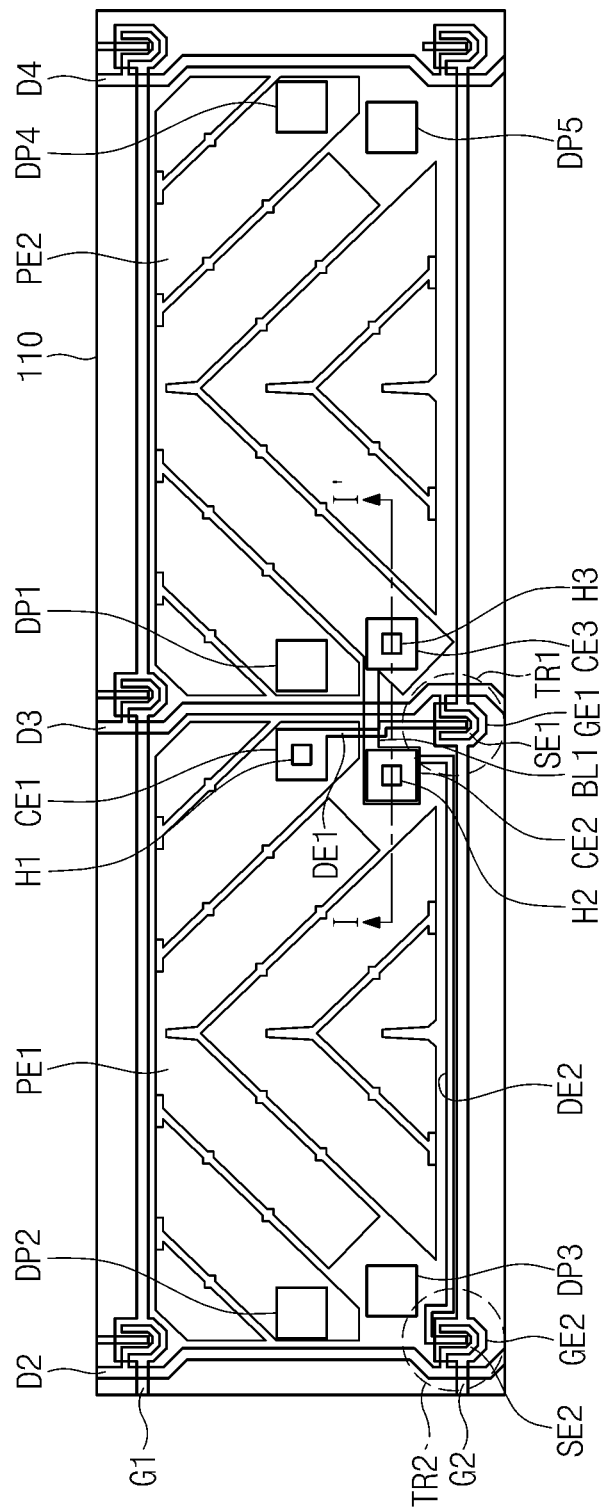
FIG. 14 is a view showing a layout of a first part shown in FIG. 13.
Figure 15:
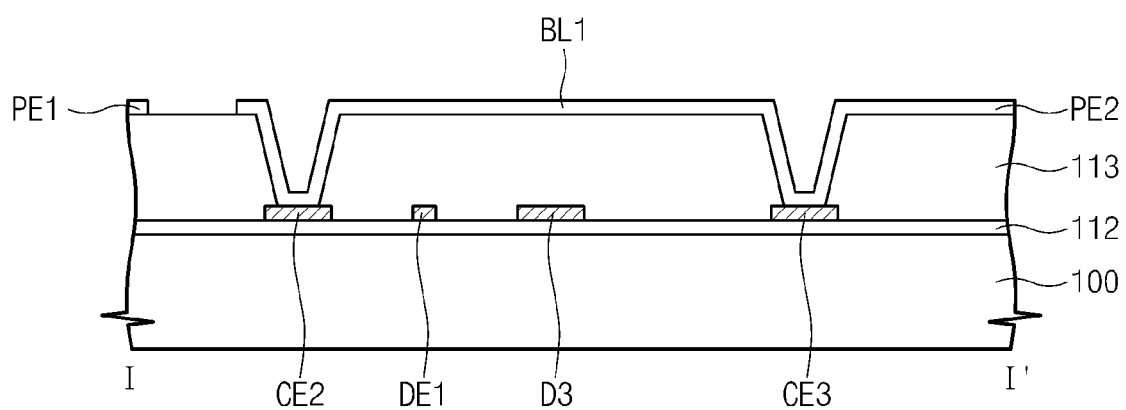
FIG. 15 is a sectional view taken along line I-I' of FIG. 14.

FIG. 14 is a view showing the layout of a first part A1 shown in FIG. 13, and FIG. 15 is a sectional view taken along line I-I' of FIG. 14.

Referring to FIGS. 14 to 15, the first part A1 includes the first gate line G1, the second gate line G2, the second data line D2, the third data line D3, and the fourth data line D4. The first and second gate lines G1 and G2 extend in the row direction while being spaced apart from each other with a predetermined distance. The second to fourth data lines D2 to D4 extend in the column direction while being spaced apart from each other with a predetermined distance.

A dot in the region defined by the first and second gate lines G1 and G2 and the second and third data lines D2 and D3 includes a first thin film transistor TR1 electrically connected to the second gate line G2 and the third data line D3 and a first dot electrode PE1 electrically connected to the first thin film transistor TR1. A dot in the region defined by the first and second gate lines G1 and G2 and the third and fourth data lines D3 and D4 includes a second thin film transistor TR2 electrically connected to the second gate line G2 and the third data line D3 and a second dot electrode PE2 electrically connected to the second thin film transistor TR2.

The second dot electrode PE2 is provided in the region defined by the first and second gate lines G1 and G2 and the third and fourth data lines D3 and D4, and the second thin film transistor TR2 is provided adjacent to the intersection of the second gate line G2 and the second data line D2.

The first thin film transistor TR1 includes a first gate electrode GE1 branching from the second gate line G2, a first source electrode SE1 branching from the third data line D3, and a first drain electrode DE1 extending along the third data line D3 while being adjacent to the third data line D3. The first drain electrode DE1 is electrically connected to a first contact electrode CE1.

The second thin film transistor TR2 includes a second gate electrode GE2 branching from the second gate line G2, a second source electrode SE2 branching from the second data line D2, and a second drain electrode DE2 extending along the second gate line G2 while being adjacent to the second gate line G2. The second drain electrode DE2 is electrically connected to a second contact electrode CE2 adjacent to the first contact electrode CE1. A third contact electrode CE3 symmetrical to the second contact electrode CE2 about the third data line D3 is further provided.

The second contact electrode CE2 is electrically connected to the third contact electrode CE3 through the first bridge line BL1. The first bridge line BL1 is provided on a layer different from that of the third data line D3, such that the first bridge line BL1 does not contact the third data line D3.

The first and second dot electrodes PE1 and PE2 include transparent conductive material such as indium tin oxide (ITO) or indium zinc oxide (IZO).

As shown in FIG. 15, an insulating layer 113 is provided on the lower substrate 100 of the liquid crystal panel 350 to cover the second to fourth data lines D2, D3, and D4. According to an exemplary embodiment, the first bridge line BL1 may include a material identical to that of the first and second dot electrodes PE1 and PE2, that is, ITO or IZO, and may be provided on the insulating layer 113.

In this case, first, second and third contact holes H1, H2 and H3 are formed in the insulating layer 113 to expose the first to third contact electrodes CE1, CE2, and CE3, respectively. The first dot electrode PE1 provided on the insulating layer 113 is electrically connected to the first contact electrode CE1 through the first contact hole H1, and the first bridge line BL1 provided on the insulating layer 113 is electrically connected to the second and third contact electrodes CE2 to CE3 through the second and third contact holes H2 and H3. Although the first bridge line BL1 is electrically insulated from the first dot electrode PE1, the first bridge line BL1 is electrically connected to the second dot electrode PE2.

Referring to FIG. 14 again, the first and second contact electrodes CE1 and CE2 are provided in the left side of the third data line D3, and the third contact electrode CE3 is provided in the right side of the third data line D3. A first dummy pattern DP1 having the same shape as that of the first contact electrode CE1 is further provided in the right side of the third data line D3 such that the first dummy pattern DP1 is symmetrical to the first contact electrode CE1 about the third data line D3.

The liquid crystal panel 350 further includes second and third dummy patterns DP2 and DP3 symmetrical to the first and second contact electrodes CE1 and CE2 about a central line midway between and perpendicular to a virtual line connecting the second data line D2 to the third data line D3.

FIGS. 16A to 16F are sectional views showing a manufacturing process of the liquid crystal panel 350 shown in FIG. 14.

Figure 16A:
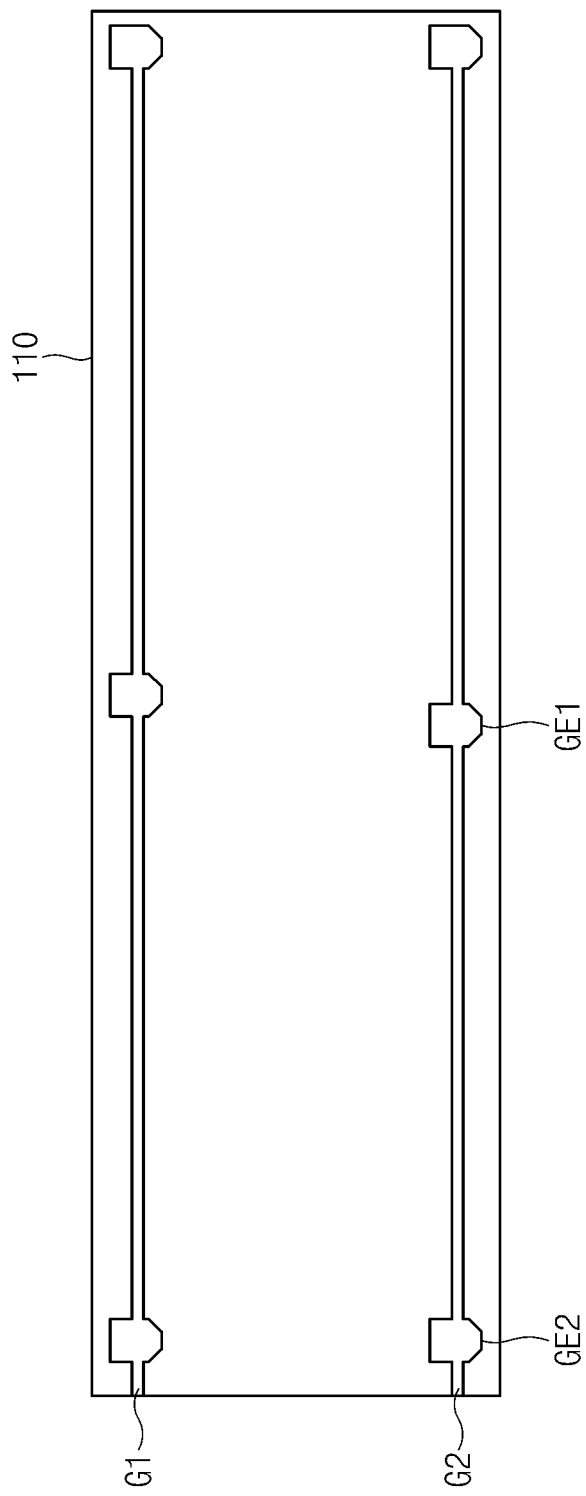
FIGS. 16A to 16F are sectional views showing a manufacturing process of the liquid crystal panel shown in FIG. 14.

Referring to FIG. 16A, after forming a first metallic layer (not shown) on the lower substrate 100 of the liquid crystal panel 350, the first metallic layer is patterned, thereby forming the first gate line G1, the second gate line G2, the first gate electrode GE1, and the second gate electrode GE2.

As shown in FIG. 15, the first gate line G1, the second gate line G2, the first gate electrode GE1, and the second gate electrode GE2 may be covered by the gate insulating layer 112. An amorphous silicon layer and an n+ amorphous silicon layer may be sequentially stacked on the gate insulating layer 112. The amorphous silicon layer and the n+ amorphous silicon layer are patterned such that amorphous silicon layer and the n+ amorphous silicon layer can be positioned in a region where a data line, a source electrode, and a drain electrode may be formed later.

Figure 16B:
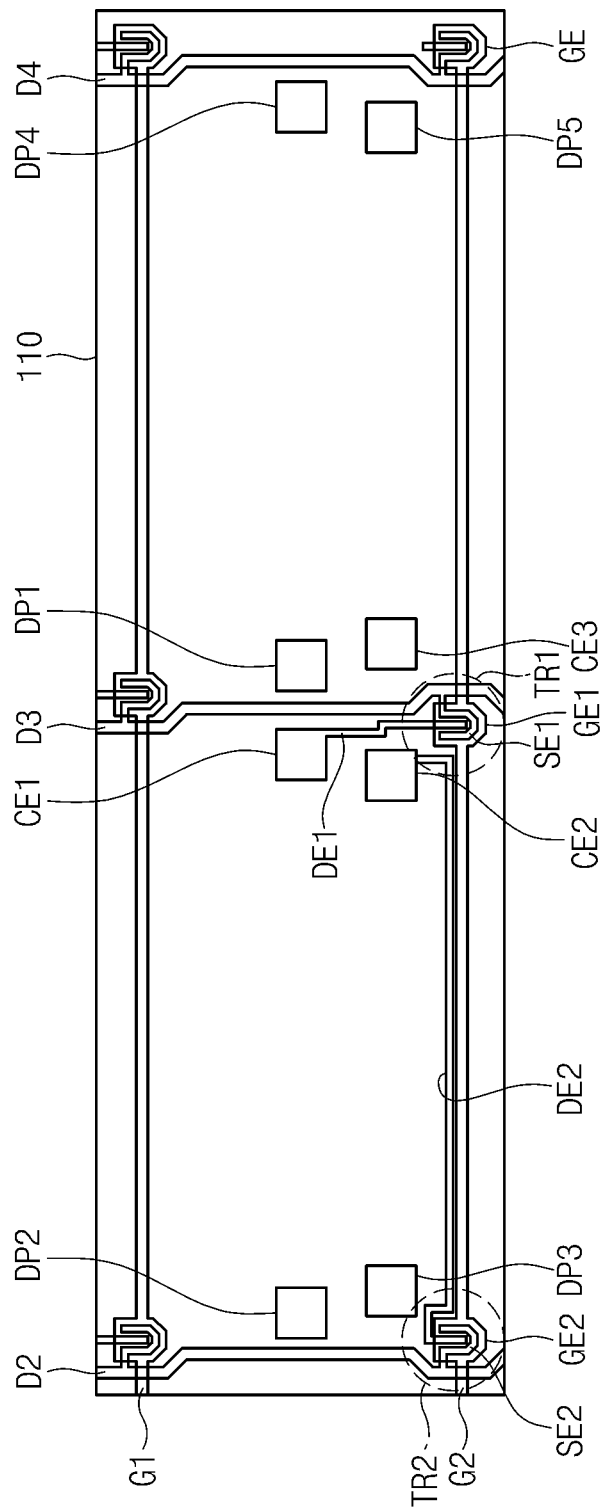

Referring to FIG. 16B, after forming a second metallic layer (not shown) on the gate insulating layer 112, the second metallic layer is patterned, thereby forming the second to fourth data lines D2, D3, and D4, the first and second source electrodes SE1 and SE2, and the first and second drain electrodes DE1 and DE2. The first and second thin film transistors TR1 and TR2 can be formed on the lower substrate 100.

In addition, there are formed on the gate insulating layer 112 the first and second contact electrodes CE1 and CE2 connected to the first and second drain electrodes DE1 and DE2, respectively, and the third contact electrode CE3 symmetrical to the second contact electrode CE2 about the third data line D3. In addition, first to fifth dummy patterns DP1 to DP5 are formed on the gate insulating layer 112. Details of the first to fifth dummy patterns DP1 to DP5 will be omitted in order to avoid redundancy.

Figure 16C:
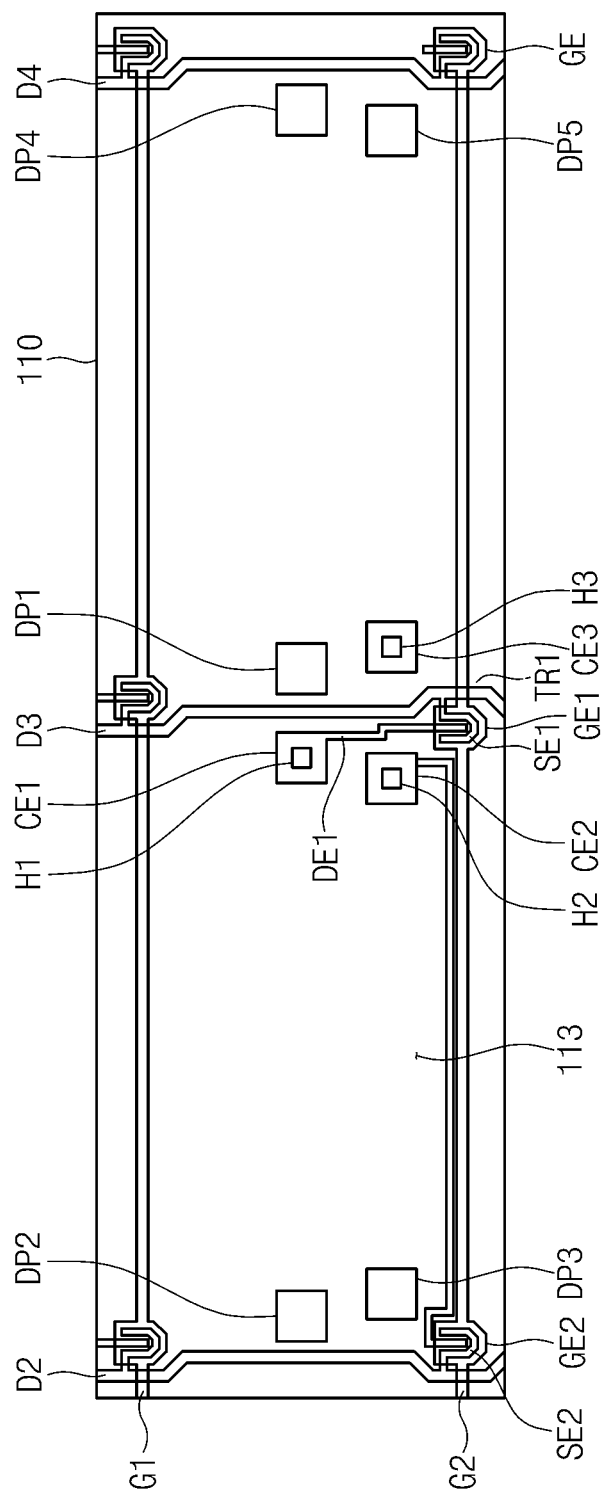

Thereafter, referring to FIG. 16C, the second to fourth data lines D2, D3, and D4, the first and second thin film transistors TR1 and TR2, and the first to third contact electrodes CE1, CE2, and CE3, and the first to fifth dummy patterns DP1 to DP5 are covered by the insulating layer 113. The insulating layer 113 may include an organic insulating material. The first to third contact holes H1 to H3 are formed through the insulating layer 113 to expose the first to third contact electrodes CE1 to CE3.

Figure 16D:
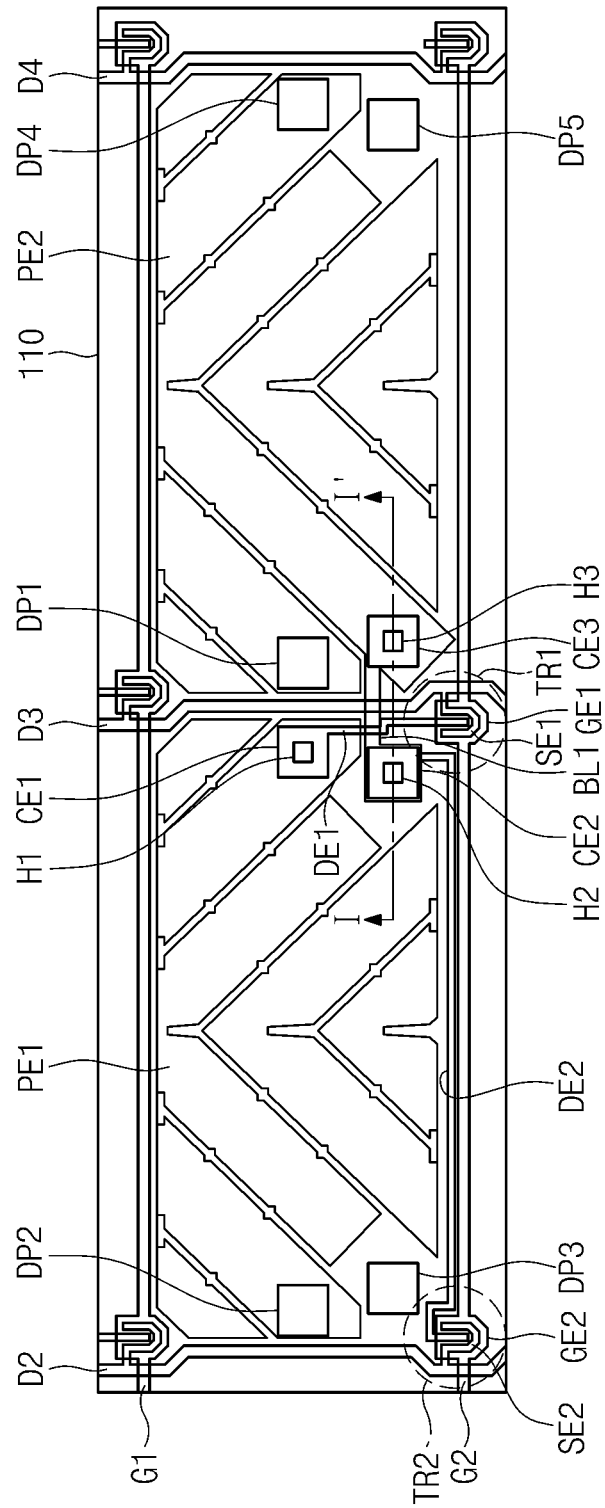

Referring to FIG. 16D, the first dot electrode PE1, the second dot electrode PE2, and the first bridge line BL1 are formed on the insulating layer 113. The first dot electrode PE1 is connected to the first contact electrode CE1 through the first contact hole H1, and the first bridge line BL1 is connected to the second and third contact electrodes CE2 and CE3 through the second and third contact holes H2 and H3, respectively. The first bridge line BL1 is electrically connected to the second dot electrode PE2.

Figure 16E:
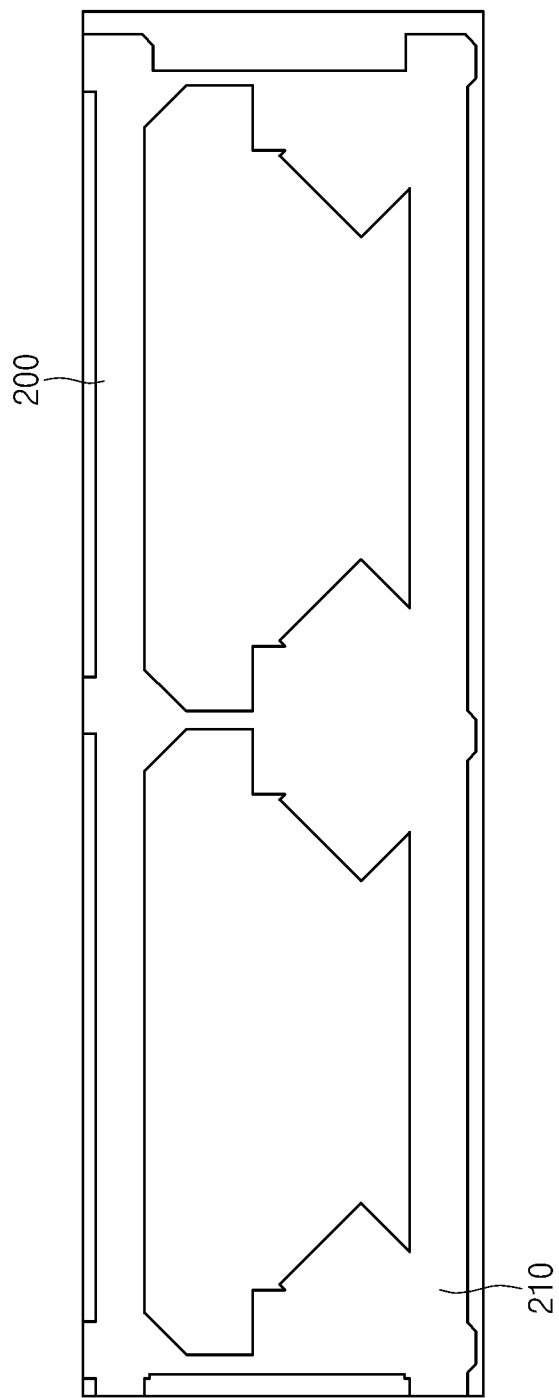

Subsequently, referring to FIG. 16E, a black matrix 210 is provided on the upper substrate 200 facing the lower substrate 100. The black matrix 210 includes a light shielding material, and is provided corresponding to a non-effective display region of the lower substrate 100.

Figure 16F:
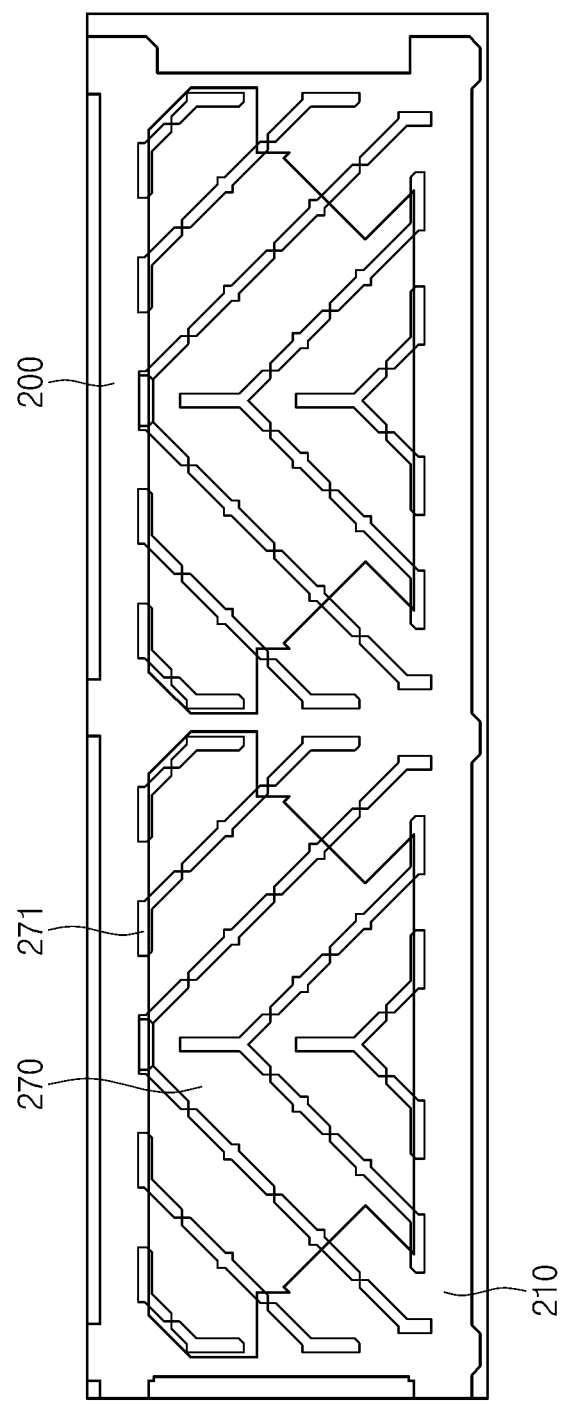

Referring to FIG. 16F, the common electrode 270 is further provided on the upper substrate 200 to face the first and second dot electrodes PE1 and PE2. Openings 271 may be further formed in the common electrode 270.

Figure 17:
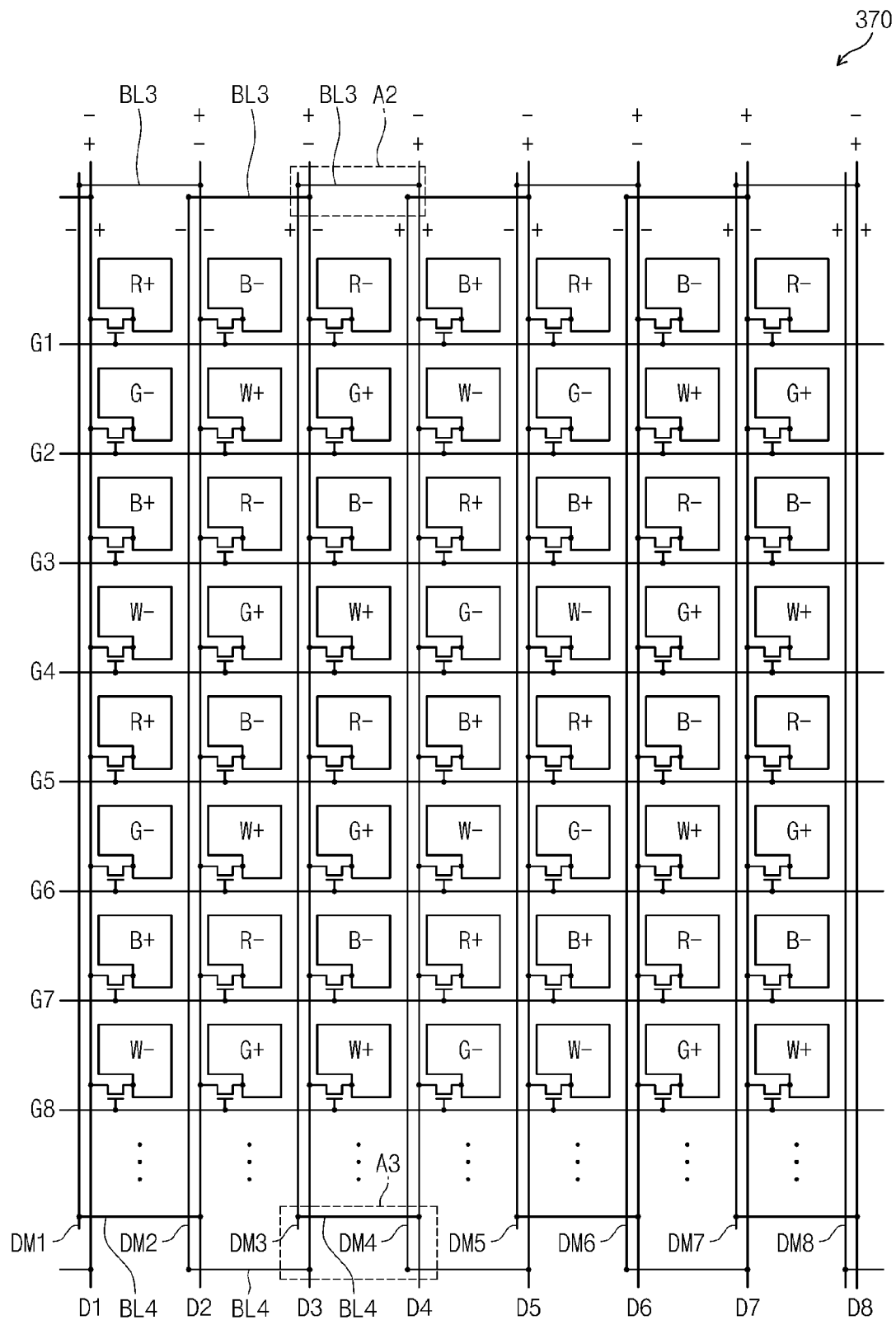
FIG. 17 is a circuit diagram showing the dot arrangement of a liquid crystal panel according to an exemplary embodiment of the present invention and a polarity of data voltage applied to each dot.

FIG. 17 is a circuit diagram showing the dot arrangement of a liquid crystal panel 370 according to another exemplary embodiment of the present invention and the polarity of data voltage applied to each dot.

Referring to FIG. 17, each dot can represent one of primary colors including R, G, B, and W colors. Dots representing the R, G, B, and W colors may constitute one pixel. Two dots among the dots constituting one pixel are adjacent to each other in a $p^{th}$ dot row, and two remaining dots are adjacent to each other in a $(p+1)^{th}$ dot row. The liquid crystal panel 370 may include a plurality of pixels repeatedly arranged in the column or row directions.

In this case, a dot expressed as 'R+' represents a red dot to receive a positive data voltage, and a dot expressed as 'R−' represents a red dot to receive a negative data voltage. A dot expressed as 'G+' represents a green dot to receive a positive data voltage, and a dot expressed as 'G−' represents a green dot to receive a negative data voltage. A dot expressed as 'B+' represents a blue dot to receive a positive data voltage, and a dot expressed as 'B−' represents a blue dot to receive a negative data voltage. A dot expressed as 'W+' represents a white dot to receive a positive data voltage, and a dot expressed as 'W−' represents a white dot to receive a negative data voltage.

Referring to FIG. 17, the liquid crystal panel 370 includes a plurality of first pixels PI1 and a plurality of second pixels PI2. Each first pixel PI1 includes dots representing red, green, blue, and white colors, and each second pixel PI2 includes dots representing red, green, blue, and white colors. The dots of each first pixel PI1 are arranged in the sequence of R, G, B, and W along the column direction, and the dots of each second pixel PI2 are arranged in the sequence of B, W, R, and G along the column direction. At least one pixel column of the liquid crystal panel 370 may include the first pixels PI1, and a pixel column adjacent to a pixel column of the first pixels PI1 may include the second pixels PI2.

The data driver 500 drives a plurality of dots through a dot inversion scheme to output data voltages of +, +, −, and − to four adjacent data lines. Accordingly, the polarities of the dots are reversed every two dots in the row direction and reversed every one dot in the column direction.

A dot column provided between two adjacent data lines includes dots electrically connected to the left data line.

Figure 18:
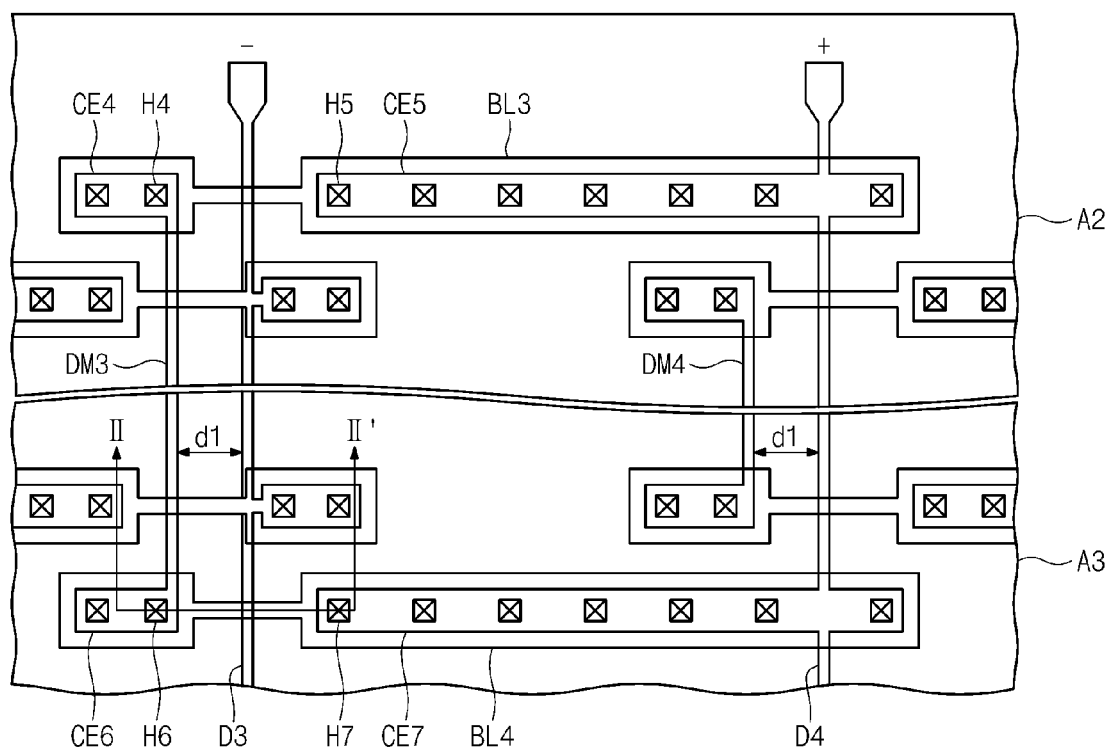
FIG. 18 is an enlarged view showing second and third parts of FIG. 17.

The liquid crystal panel 370 further includes dummy data lines DM1 to DM8 extending in parallel to the data lines D1 to D8, respectively. As shown in FIG. 18, the first dummy data line DM1 among the dummy data lines DM1 to DM8 is provided in adjacent to the first data line D1, and the second dummy data line DM2 is provided in adjacent to the second data line D2. Particularly, dummy data lines are provided at the left side of the data lines corresponding to the dummy data lines, respectively.

The liquid crystal panel 370 includes bridge lines, each electrically connecting a $(k+1)^{th}$ data line (k is a natural number of 2 or more) to a $(k-1)^{th}$ dummy data line. The bridge lines include third bridge lines BL3 each connecting a first end of the $(k+1)^{th}$ data line to a first end of the $(k-1)^{th}$ dummy data line, and fourth bridge lines BL4 each connecting a second end of the $(k+1)^{th}$ data line to a second end of the $(k-1)^{th}$ dummy data line.

In this case, the left side of dots provided in the $k^{th}$ dot column is adjacent to a $k^{th}$ data line, the right side of the dots provided in the $k^{th}$ dot column is closer to a $k^{th}$ dummy data line than the (k+1)th data line.

Referring to FIG. 17, when polarities of the dots are reversed every two dots in the row direction, two dots adjacent to each other in the row direction may receive data voltages having the same polarity. If the data voltages having the same polarity are applied to the two adjacent dots as described above, the two dots may be brighter than the other dots due to a coupling capacitance.

In order to prevent the two dots from being brighter than the other dots as described above, a dummy data line, which receives a data voltage having a polarity different from the polarity of the data voltages applied to the two dots, is interposed between two adjacent dots to receive the data voltages having the same polarity. The coupling capacitance is canceled by the dummy data line, thereby preventing a specific dot from being brighter than the other dots due to the coupling capacitance.

Both ends of the dummy data line are electrically connected to first and second ends of a corresponding data line through the third and fourth bridge lines BL3 and BL4, respectively. Accordingly, each dummy data line can serve as a repair line of the data line. In other words, when the data line is opened, the dummy data line serves as the data line.

Figure 19:
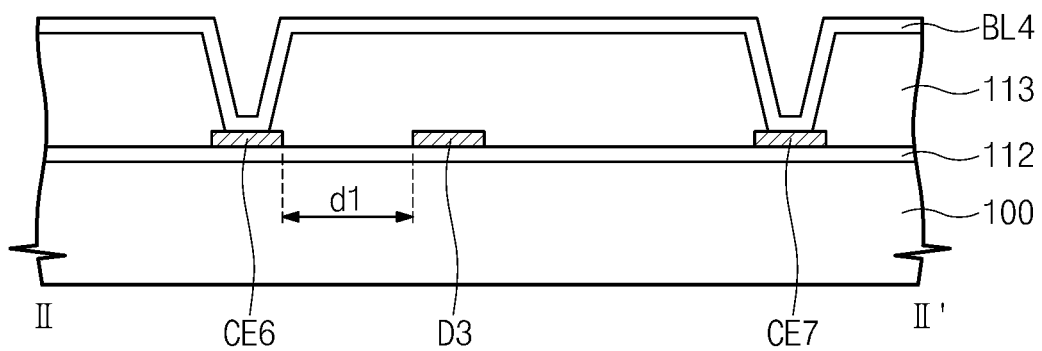
FIG. 19 is a sectional view taken along line II-II' of FIG. 18.

FIG. 18 is an enlarged view showing second and third parts A2 and A3 of FIG. 17, and FIG. 19 is a sectional view taken along line II-II' of FIG. 18.

Referring to FIGS. 18 and 19, the second part A2 of the liquid crystal panel 370 has the third and fourth data lines D3 and D4, and the third and fourth dummy data lines DM3 and DM4. The third data line D3 is spaced apart from the third dummy data line DM3 at a distance d1 of about 7 μm. Similarly, the fourth data line D4 is spaced apart from the fourth dummy data line DM4 at a distance d1 of about 7 μm.

The third dummy data line DM3 is positioned at the left side of the third data line D3 and electrically connected to the fourth data line D4. In particular, a first end of the third dummy data line DM3 is electrically connected to the fourth data line D4 through the third bridge line BL3, and a second end of the third dummy data line DM3 is electrically connected to the fourth data line D4 through the fourth bridge line BL4.

The lower substrate 100 of the liquid crystal panel 370 includes a fourth contact electrode CE4 extending from the first end of the third dummy data line DM3, a fifth contact electrode CE5 extending to the first end from the fourth data line D4, a sixth contact electrode CE6 extending from the second end of the third dummy data line DM3, and a seventh contact electrode CE7 extending from the fourth data line D3 to the second end.

The insulating layer 113 is provided on the lower substrate 100 to cover the third and fourth data lines D3 and D4, the third and fourth dummy data lines DM3 and DM4, and the fourth to seventh contact electrodes CE4 to CE7. The a fourth contact hole H4, a fifth contact hole H5, a sixth contact hole H6, and a seventh contact hole H7 are formed through the insulating layer 113 to expose the fourth to seventh contact electrodes CE4 to CE7, respectively.

The third to fourth bridge lines BL3 to BL4 include ITO or IZO. The third to fourth bridge lines BL3 and BL4 are provided on the insulating layer 113. The third bridge line BL3 is connected to the fourth and fifth contact electrodes CE4 to CE5 through the fourth and fifth contact holes H4 and H5, respectively. Accordingly, the third dummy data line DM3 can be electrically connected to the fourth data line D4 through the third bridge line BL3. The fourth bridge line BL4 is connected to the sixth and seventh contact electrodes CE6 and CE7 through the sixth and seventh contact holes H6 and H7, respectively. Accordingly, the third dummy data line DM3 can be electrically connected to the fourth data line D4 through the fourth bridge line BL4.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a plurality of pixels arranged in first and second directions, each pixel comprising at least one dot:
a plurality of data lines extending in the first direction, each data line being positioned between two adjacent dots;
a plurality of gate lines extending in the second direction, each gate line being positioned between two adjacent dots; and
a first bridge line to connect the second dot to the $(m+2)^{th}$ data line,
wherein, among dots arranged in the first direction between an $m^{th}$ data line and an $(m+1)^{th}$ data line, at least one first dot is connected to one of the $m^{th}$ data line and the $(m+1)^{th}$ data line, and at least one second dot is connected to one of an $(m-1)^{th}$ data line and an $(m+2)^{th}$ data line, and wherein a dot is positioned between the $(m-1)^{th}$ data line and the $(m+2)^{th}$ data line, and a dot is positioned between the $(m-1)^{th}$ data line and the $m^{th}$ data line, wherein the first dot is connected to the $(m+1)^{th}$ data line, and the second dot is connected to the $(m+2)^{th}$ data line, wherein the first bridge line comprises a material different from a material of the data lines and the gate lines, wherein the first dot comprises a first thin film transistor and a first dot electrode, the second dot comprises a second thin film transistor and a second dot electrode, and the first and second dot electrodes comprise a material identical to the material of the first bridge line, and wherein the first dot comprises a first contact electrode branching from a drain electrode of the first thin film transistor and a second contact electrode branching from a drain electrode of the second thin film transistor, and the second dot comprises a third contact electrode symmetrical to the second contact electrode about the $(m+1)^{th}$ data line and a first dummy pattern symmetrical to the first contact electrode about the $(m+1)^{th}$ data line.

2. The display apparatus of claim 1, wherein the first bridge line electrically connects the second contact electrode to the third contact electrode and is electrically connected to the second dot electrode.

3. The display apparatus of claim 1, wherein the first dot further comprises third and fourth dummy patterns symmetrical to the first and second contact electrodes, respectively, about a first line midway between and perpendicular to a virtual line connecting the $m^{th}$ data line to the $(m+1)^{th}$ data line, and the second dot further comprises fifth and sixth dummy patterns symmetrical to the third contact electrode and the first dummy pattern, respectively, about a second line midway between and perpendicular to a virtual line connecting the $(m+1)^{th}$ data line to the $(m+2)^{th}$ data line.

4. The display apparatus of claim 1, wherein each of the pixels comprises red, green, blue, and white dots,
at least one first pixel of the pixels comprises dots arranged in a first sequence of red, green, blue, and white colors along the first direction, and
at least one second pixel of the pixels comprises dots arranged in a second sequence of blue, white, red, and green colors along the first direction.

5. The display apparatus of claim 4, wherein the first and second pixels are alternately arranged with each other in the second direction, and data voltages having different polarities are applied to two adjacent data lines of the data lines.

6. The display apparatus of claim 1, wherein the first and second dot electrodes and the first bridge line comprise indium tin oxide (ITO) or indium zinc oxide (IZO).

7. A display apparatus comprising:
a plurality of pixels arranged in first and second directions, each pixel comprising at least one dot;
a plurality of data lines extending in the first direction, each data line being positioned between two adjacent dots;
a plurality of gate lines extending in the second direction, each gate line being positioned between two adjacent dots; and
a plurality of dummy data lines extending in the first direction, each dummy data line being positioned between two adjacent dots,
wherein a $(k-1)^{th}$ dummy data line among the dummy data lines is arranged adjacent to a $k^{th}$ data line and is electrically connected to a $(k+1)^{th}$ data line, in which k is a natural number greater than or equal to 2, and wherein no dot is positioned between the $(k-1)^{th}$ dummy data line and the $k^{th}$ data line.

8. The display apparatus of claim 7, further comprising:
a bridge line to electrically connect the $(k-1)^{th}$ dummy data line to the $(k+1)^{th}$ data line.

9. The display apparatus of claim 8, wherein the bridge line comprises a third bridge line to connect a first end of the $(k-1)^{th}$ dummy data line to a first end of the $(k+1)^{th}$ data line, and a fourth bridge line to connect a second end of the $(k-1)^{th}$ dummy data line to a second end of the $(k+1)^{th}$ data line.

10. The display apparatus of claim 7, wherein four adjacent data lines among the data lines receive data voltages of a positive polarity (+), a negative polarity (−), a negative polarity (−), and a positive polarity (+), respectively.

11. The display apparatus of claim 7, wherein each of the pixels comprises red, green, blue, and white dots,
at least one first pixel of the pixels comprises dots arranged in a first sequence of red, green, blue, and white colors along the first direction, and
at least one second pixel of the pixels comprises dots arranged in a second sequence of blue, white, red, and green colors along the first direction.

12. The display apparatus of claim 11, wherein the first and second pixels are alternately arranged with each other in the second direction.

* * * * *